(12) United States Patent
Navarro et al.

(10) Patent No.: US 9,983,890 B2
(45) Date of Patent: May 29, 2018

(54) COLLABORATIVE GENERATION OF CONFIGURATION TECHNICAL DATA FOR A PRODUCT TO BE MANUFACTURED

(71) Applicant: DIGITAL PRODUCT SIMULATION, La Celle Saint Cloud (FR)

(72) Inventors: Antoine Navarro, Paris (FR); Julien Badin, Marolles en Brie (FR); Matthias Austruy, Chatou (FR); Abdoulaye Sow, Rueil Malmaison (FR)

(73) Assignee: DIGITAL PRODUCT SIMULATION, La Celle Saint Cloud (FR)

( * ) Notice: Subject to any disclaimer, the term of this patent is extended or adjusted under 35 U.S.C. 154(b) by 237 days.

(21) Appl. No.: 15/093,914

(22) Filed: Apr. 8, 2016

(65) Prior Publication Data

US 2016/0299771 A1 Oct. 13, 2016

(30) Foreign Application Priority Data

Apr. 8, 2015 (EP) .................................... 15305519

(51) Int. Cl.
*G06F 9/44* (2018.01)
*G06F 9/445* (2018.01)
*G06F 17/50* (2006.01)

(52) U.S. Cl.
CPC .......... *G06F 9/44505* (2013.01); *G06F 17/50* (2013.01); *G06F 2217/04* (2013.01); *G06F 2217/06* (2013.01)

(58) Field of Classification Search
CPC ...................................................... G06F 9/44

(Continued)

(56) References Cited

U.S. PATENT DOCUMENTS

| 7,814,429 | B2* | 10/2010 | Buffet | G06Q 10/10 |
| | | | | 715/763 |
| 2009/0276752 | A1* | 11/2009 | Sharma | G06F 8/20 |
| | | | | 717/103 |
| 2016/0125016 | A1* | 5/2016 | Cota-Robles | G06F 17/30371 |
| | | | | 707/690 |

* cited by examiner

Primary Examiner — Jaweed A Abbaszadeh
Assistant Examiner — Keshab Pandey
(74) Attorney, Agent, or Firm — Osha Liang LLP

(57) ABSTRACT

A reference configuration is defined in a main software by a set of reference data vectors, each reference data vector referring to a technical aspect of said product. A reference data vector comprises at least one configuration parameter and/or at least one constraint to be verified by a value assigned to a configuration parameter of a reference data vector. User data vectors are instantiated on the basis of a subset of reference data vectors of the reference configuration and define a user configuration.

A software synchronization module 111 running on one said user terminal in the context of an auxiliary software generates at least one value for a parameter associated to a configuration parameter in the main software. The value is assigned to associated configuration parameter of at least one user data vector instantiated in the main software. A compliance check is performed relatively to constraints defined in the main software for the associated configuration parameter. An indicator representative of a result of the compliance check is sent to the software synchronization module 111.

A consistency check is performed by comparing values assigned to a same configuration parameter in at least one first modified data vector of the first user configuration and in a second modified data vector of the second user configuration.

16 Claims, 17 Drawing Sheets

(58) Field of Classification Search
USPC .................................................. 713/300–375
See application file for complete search history.

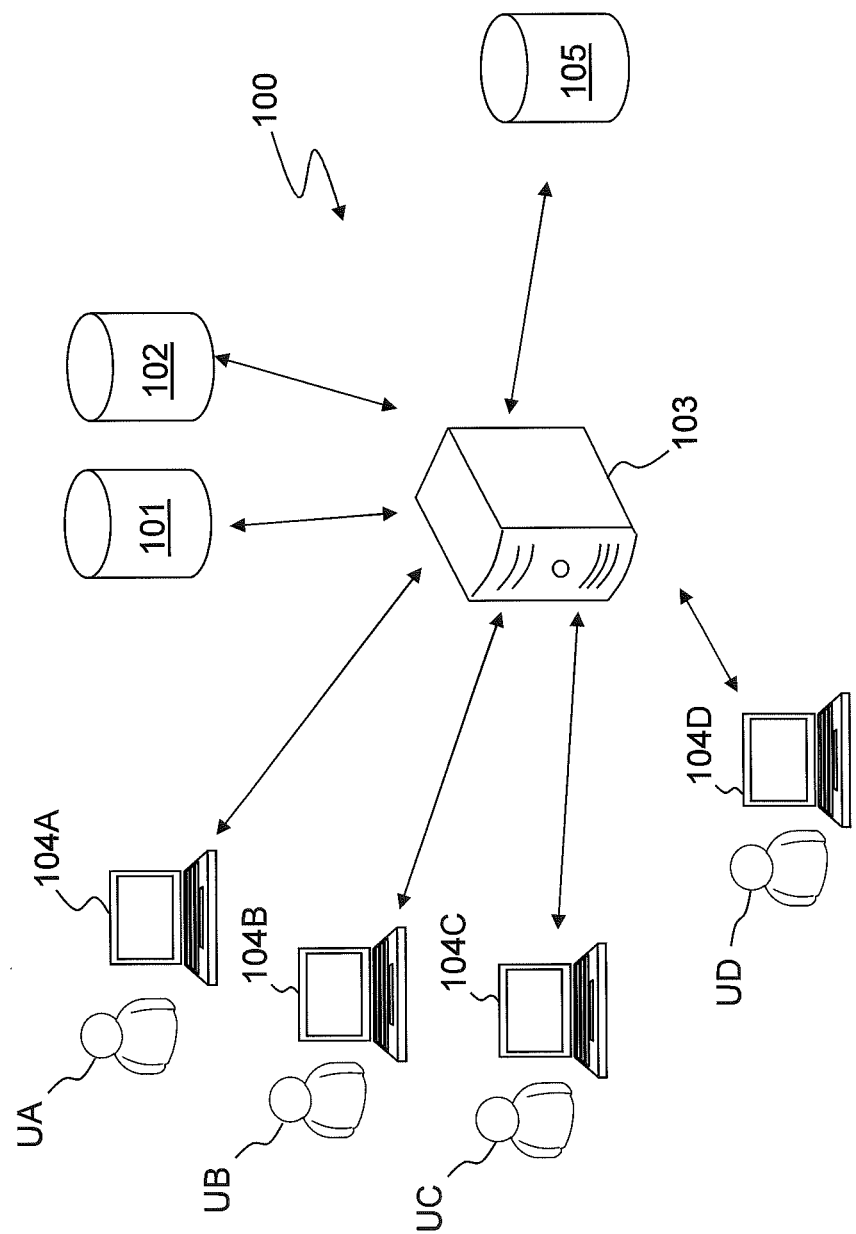

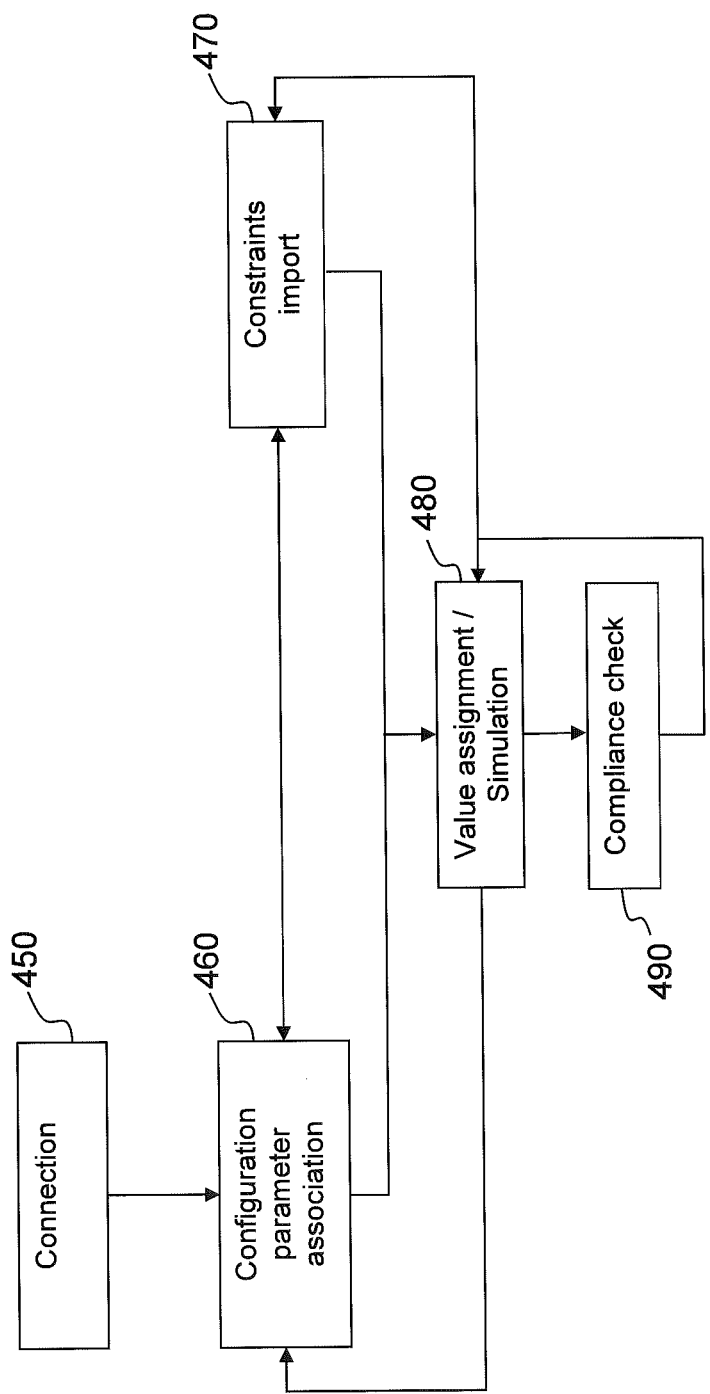

| Instantiated Data Vector List | | | | | | ? X |
|---|---|---|---|---|---|---|
| Instance | Version | Physical quantity | Nominal value / Unit | Maturity level | Acceptability range | Weighting function |
| IC1_A | V5 | | | | | |
| Length1 | | Length | 1 m | 3 | 1 - 2 m | 50 - 100 |
| High1 | | Length | 0,5 m | 3 | 0 - 1 m | 50 - 100 |
| Vol1 | | Volume | 1,5 m3 | 3 | 1 - 2 m3 | 25 - 100 |
| Mass1 | | Mass | 250 kg | 2 | 200 - 300 kg | $(x - 250)^2$ |
| ⊕ contraints | | | | | | |
| IC2_A | V1 | | | | | |
| Vol2 | | Volume | 2 m3 | 1 | 1 - 3 m3 | $(x - 2)^2$ |
| ⊕ contraints | | | | | | |
| IC3_A | V1 | | | | | |
| Length3 | | Length | 1 m | 1 | 1 m | |
| Mass3 | | Mass | 30 kg | 1 | 20 - 30 kg | |
| Density3 | | Density | 15 kg / m3 | 1 | 10 - 50 kg / m3 | |
| ⊕ contraints | | | | | | |
| IC7_A | V2 | | | | | |
| Strength7 | | Force | 30 N | 1 | 25 - 45 N | |
| Acc7 | | Acceleration | 1 m / s2 | 2 | 1 m / s2 | |
| ⊕ contraints | | | | | | |
| | | | | | OK | Cancel |

FIG.5A

Parameter List

| | Name | Instance | Physical quantity | Nominal value / Unit | Maturity level | Acceptability range | Weighting function |
|---|---|---|---|---|---|---|---|
| 513 | Length1 | IC1_A | Length | 1 m | 3 | 1 - 2 m | 50 - 100 |
| 514 | High1 | IC1_A | Length | 0,5 m | 3 | 0 - 1 m | 50 - 100 |
| 515 | Vol1 | IC1_A | Volume | 1,5 m3 | 3 | 1 - 2 m3 | 25 – 100 |
| 516 | Mass1 | IC1_A | Mass | 250 kg | 2 | 200 - 300 kg | $(x - 250)^2$ |
| 517 | Vol2 | IC2_A | Volume | 2 m3 | 1 | 1 - 3 m3 | |
| 518 | Length3 | IC3_A | Length | 1 m | 1 | 1 m | $(x - 2)^2$ |
| 519 | Mass3 | IC3_A | Mass | 30 kg | 1 | 20 - 30 kg | |
| 520 | Density3 | IC3_A | Density | 15 kg / m3 | 1 | 10 - 50 kg / m3 | |
| | Strength7 | IC7_A | Force | 30 N | 1 | 25 - 45 N | |
| | Acc7 | IC7_A | Acceleration | 1 m / s2 | 2 | 1 m / s2 | |

Contraint List

| | Name | Instance | Instruction | | Ignored |
|---|---|---|---|---|---|
| 523 | CL | IC1_A | IF ( Length1 > 4 m ) THEN ( High1 > 5 m ) | | |
| 524 | CM | IC1_A | Length1 < High1 | | |
| 525 | CV | IC1_A | Mass1 in [50;70] kg | | ✓ |
| 526 | CNE | IC1_A | Length1; Vol1 | | ✓ |
| 527 | BETA1 | IC2_A | Vol2 = Length1 * High1 * High1 | | |
| 528 | BETA2 | IC3_A | Density3 = Mass3 / Vol2 | | |
| 529 | BETA3 | IC7_A | Strength7 = Acc7 / Mass3 | | |

OK    Cancel

FIG.5B

| User configuration(s) | | | | |
|---|---|---|---|---|
| Instance | Physical quantity | Value in RCA | Value in UCB | Value in UCC |
| IC1_A | | | | |
| Length1 | Length | 1 m | 1 m | 2 m |
| High1 | Length | 0,5 m | 0,5 m | 2,5 m |
| Vol1 | Volume | 1,5 m3 | 1,5 m3 | 3 m3 |
| Mass1 | Mass | 250 kg | 250 kg | 245 kg |
| ⊕ contraints | | | | |
| IC2_A | | | | |
| Vol2 | Volume | 2 m3 | 2 m3 | 2 m3 |
| ⊕ contraints | | | | |
| IC3_A | | | | |
| Length3 | Length | 1 m | | 1 m |
| Mass3 | Mass | 30 kg | | 37 kg |
| Density3 | Density | 15 kg / m3 | | 15 kg / m3 |
| ⊕ contraints | | | | |
| IC7_A | | | | |
| Strength7 | Force | 30 N | 30 N | |
| Acc7 | Acceleration | 1 m / s2 | 1 m / s2 | |
| ⊕ contraints | | | | |

FIG.5C

COMPLIANT PARAMETER(S) — 610

| Name | Instance | Value |
|---|---|---|
| Vol1 | IC1_A | 1,5 m3 |
| Mass1 | IC1_A | 50 kg |

NON COMPLIANT PARAMETER(S) — 620

| Name | Instance | Value |
|---|---|---|
| Length1 | IC1_A | 1 m |
| High1 | IC1_A | 0,5 m |
| Vol2 | IC2_A | 2 m3 |

CONSTRAINT LIST — 630

| Name | Instance | Instruction | Ignored |
|---|---|---|---|
| CL | IC1_A | IF ( Length1 > 4 m ) THEN ( High1 > 5 m ) | |
| CM | IC1_A | Length1 > High1 | ✓ |
| CV | IC1_A | Mass1 in [50;70] kg | |
| CNE | IC1_A | Length1; Vol1 | ✓ |
| BETA1 | IC2_A | Vol2 = Length1 * High1 * High1 | |

OK        Cancel

FIG.6A

| Parameter(s) with conflict | | | | |
|---|---|---|---|---|
| Name | Instance | Ignored | Value in UCB | Value in UCC |
| Length1 | IC1_A | | 1 m | 2 m |
| High1 | IC1_A | ✓ | 0,5 m | 2,5 m |
| Vol1 | IC1_A | ✓ | 1,5 m3 | 3 m3 |
| Mass1 | IC1_A | | 250 kg | 245 kg |

640

| Parameter(s) without conflict | | | |
|---|---|---|---|
| Name | Instance | Value in RCA | Value in UCB | Value in UCC |
| Vol2 | IC2_A | 2 m3 | 2 m3 | 2 m3 |
| Strength7 | IC7_A | 30 N | 30 N | |
| Acc7 | IC7_A | 1 m/s2 | 1 m/s2 | |

650

| CONSTRAINT LIST | | |
|---|---|---|
| Name | Instance | Instruction |
| CL | IC1_A | IF ( Length1 > 4 m ) THEN ( High1 > 5 m ) |
| CM | IC1_A | Length1 < High1 |
| CV | IC1_A | Mass1 in [50;70] kg |
| CNE | IC1_A | Length1; Vol1 |
| BETA1 | IC2_A | Vol2 = Length1 * High1 * |
| BETA2 | IC3_A | Density3 = Mass3 / Vol2 |
| BETA3 | IC7_A | Strength7 = Acc7 / Mass3 |

660

OK      Cancel

FIG.6B

Constraints import

MS Constraints to import — 740

| Name | Instruction |
|---|---|
| CV | Mass1 in [50,70] kg |
| CM | Length1 < High1 |
| BETA1 | Vol2 = Length1 * High1 * High1 |
| BETA2 | Density3 = Mass3 / Vol2 |
| BETA3 | Strength7 = Acc7 / Mass7 |

Other MS constraints — 741

| Name | Instruction |
|---|---|
| CL | IF (Length1>4m) THEN (High1>5m) |
| CNE | Length1; Vol1 |

OK    Cancel

FIG.7B

COLLABORATIVE GENERATION OF CONFIGURATION TECHNICAL DATA FOR A PRODUCT TO BE MANUFACTURED

TECHNICAL FIELD

The present subject disclosure generally relates to the field of digital data processing of configuration technical data of a product to be manufactured. This field covers different engineering aspects, in particular: knowledge management, data modelling, industrial design, digital simulation of the product or components thereof, validation and/or optimization of product parameters.

PRIOR ART

In the above cited technical field, a great variety of computer aided design and engineering (CAD/CAE) software tools have been developed. Such tools are being used for example to design, simulate and analyze the behavior, robustness and performance of different components and/or different functional aspects of a product to be manufactured.

A CAD or CAE software relies on a data models (expert models, geometric representation) on the basis of which the technical data are organized and processed according to the needs of a given engineering domain: for example, the domain of mechanical engineering, of electrical engineering, of thermic engineering, etc. Those tools usually enable to design and/or simulate efficiently technical aspects and/or components of a product that belong to a given engineering domain. They allow engineers to test several designs or architectures very quickly. However they are not suited for design and simulation of aspects and/or components that belong to different engineering domains or different data models.

For example the design and/or simulation of complex manufactured products such as automotive vehicles or planes encompasses very heterogeneous engineering domains. This results in a major difficulty which is to organize the technical data according to a generic model around which different technical experts of different engineering domains would be able to exchange technical data, to capitalize on design steps performed by each other's and to manage consistency between the technical data sets produced by the different technical experts.

Today there exists different tools and languages that facilitate the technical data exchange between models and CAD/CAE tools, for example the tools <<Product Data Management>> (PDM) or <<Simulation Data Management>> (SDM), or the data exchange format IGES or STEP.

However those tools do not provide a solution with organized communication between the different experts that would enable conflict management between data produced by these different experts and/or between technical constraints related to their different technical domains.

As a consequence, a low productivity is achieved during design and simulation phases due to lack of synchronization and coordination between the technical experts. In addition a significant amount of time is necessary for implementing several iteration steps between the technical experts before being able to produce a design configuration which would be validated by all technical experts.

The patent document U.S. Pat. No. 7,814,429B2 describes a computerized solution based on a collaborative work for visual representation of products to be manufactured. A first user may select a part of the visual representation which is displayed on his computer and share this part of the visual representation with another user on another computer. Thus the two users may share at least a common part of the visual representation of the objet. They may also chat with each other via a network by means of a chat display box displayed on each computer. However the synchronization between the two users is performed manually, each user having to decide which part of the representation has to be shared and when. In addition, the two users need to discuss together or to send a message when one need to get a different view of the object, departing from the one which is currently shared. Furthermore, it appears that they cannot work simultaneously on a same part of the object.

There is therefore a need for an improved technical data processing method and system which allows in particular for an improve collaboration and/or synchronization of the different technical experts working on the design and/or simulation of a product to be manufactured while taking the benefit of existing CAD/CAE software tools.

SUMMARY

According to a first aspect, the present disclosure concerns a method for collaborative generation of technical configuration data of a product, the method being adapted to be implemented by a computing server configured to communicate with a plurality of user terminals, the method comprising:

storing in at least one database a set of at least one reference data vector defining a reference configuration, each reference data vector referring to a technical aspect of the product, at least one reference data vector comprising at least one configuration parameter and at least one constraint with which at least one value assigned to at least one configuration parameter of a user data vector instantiated from one the reference data vector has to comply, instantiating, in response to a first respectively second request received from a first respectively second client software application running on one of the user terminals in the context of a main software, a first respectively second set of at least one user data vector from a first respectively second subset of the reference configuration, the first respectively second set of user data vectors defining a first respectively second user configuration, receiving, from at least one software synchronization module running on one of the user terminals in the context of an auxiliary software, at least one value generated by the auxiliary software and assigned to a parameter created in the auxiliary software and associated to a first configuration parameter of a first user data vector of the first user configuration, performing a first compliance check on the at least one received value relatively to at least one constraint defined in the main software for the first configuration parameter and sending to the software synchronization module at least one indicator representative of a result of the first compliance check, assigning to the first configuration parameter at least one value generated by the auxiliary software for a parameter associated to the first configuration parameter, performing a consistency check by comparing values assigned to the first configuration parameter in a first modified user data vector of the first user configuration and in a second modified user data vector of the second user configuration and sending to the first or second client software application a first piece of information indicative of the result of the consistency check.

The configuration of the product may be defined at a finest granularity level, that is to say, at the configuration parameter level, as the definition data vector contain directly the configuration parameter(s) and their relative constraint(s). Thus, different parts—also referred to as user configurations—of the configuration data of the product, may be defined as desired, for example depending on the number of technical experts that have to collaborate for the definition of the configuration data and data vectors may be instantiated for each defined part in order to enable each expert to work independently on one specific part. Those parts of the configuration data of the product may be respectively related to different objects or aspects of the product, for example to a given functional subset, a given technical domain, a given physical module of the product.

The synchronization and consistency between the different technical experts working on the design and/or simulation of a product to be manufactured is implemented by means of the main software at two levels.

Firstly, at a user configuration level, during the use of an auxiliary software (e.g. CAD/CAE software), by enabling to get inside this auxiliary software a result of a first compliance check performed on value(s) generated by the auxiliary software and assigned to a parameter defined in the auxiliary software on the basis of constraint defined for a configuration parameter of a user data vector instantiated in the main software. This enables a technical expert to work on a user configuration independently of the other technical experts working on the other user configurations, thus enabling parallel editing of the different user configurations by the different technical experts, while taking into account constraints defined in the main software for the configuration parameter(s).

Secondly, at a global level or inter-configuration level, by checking whether the values assigned to configuration parameter(s) shared between two or more user configurations are consistent. For example, in order to detect the values of a configuration parameter which are common to two or more user configurations and those which are not common.

Depending on the possibilities and functionalities of the auxiliary software, some constraints defined for a configuration parameter may be imported/defined within the auxiliary software while other constraints cannot be imported or defined within the auxiliary software. For constraints which cannot be imported within the auxiliary software but which are defined within the main software for a configuration parameter to be used in the auxiliary software for the purpose of a simulation and/or design phase performed by means of this auxiliary software, the main software provides a solution providing to the user of the auxiliary software an information on the result of a compliance check performed relatively to such constraints.

According to at least one embodiment, the method further comprises:
  receiving from the first respectively second client software application a validation request for a modified version of the first respectively second user configuration comprising at least one user data vector modified by an assignment of at least one value to a configuration parameter,
  performing a second compliance check of the first respectively second user configuration by checking for at least one modified user data vector whether at least one assigned value complies with at least one constraint defined for that value;
  sending to the first respectively second client software application a second piece of information indicative of the result of the second compliance check.

The synchronization and consistency between the different technical experts working on the design and/or simulation of a product to be manufactured may further be controlled at user configuration level, by checking that each value assigned to a configuration parameter of a user configuration complies with constraints defined for the configuration parameters which are part of that user configuration. This enables to check a user configuration independently of the other user configurations, thus enabling parallel editing of the different user configurations by the different technical experts.

In at least one embodiment of the method according to the first aspect, a plurality of values is assigned to the first configuration parameter in the first respectively second modified user data vector, the first respectively second modified user data vector comprising data defining a first respectively second weighting function for at least one value assigned to the first configuration parameter, a weight allocated to an assigned value according to the weighting function being representative of the technical relevance of the assigned value, the method comprising a determination of a set of at least one common value for the first configuration parameter on the basis of the first respectively second weighting function. The use of weighting function improves and accelerates the generation of a reference configuration which would be consistent with the recommendations of the different technical experts having worked separately on the different user configurations.

In at least one embodiment of the method according to the first aspect, at least one set of values assigned to a configuration parameter of a modified user data vector of the first respectively second user configuration is defined by at least one range of values, the second compliance check being performed for all values belonging to the range of values. The use of range of value facilitates the generation of a reference configuration based on common values which would be generated separately by different technical experts having worked separately on the different user configurations and increase the probability to find common values.

In at least one embodiment of the method according to the first aspect, at least one set of values assigned to a configuration parameter of a modified user data vector of the first respectively second user configuration is defined by a nominal value and by an acceptability range, the second compliance check being performed for the nominal value and all values belonging to the acceptability range. The use of acceptability range facilitates the generation of a reference configuration based on common values which would be generated separately by different technical experts having worked separately on the different user configurations.

In at least one embodiment of the method according to the first aspect, a modified user data vector comprises a unit name representing a unit in which a value is assigned to a configuration parameter, the method further comprising:
  storing a default unit for a configuration parameter representing a given physical quantity, the second compliance check comprising converting automatically each assigned value of a configuration parameter which is not entered in the default unit to a value in the default unit, the second compliance check being performed on the basis of values converted in the default unit.

The use of default units and functions for converting the assigned value to a default unit enables to compare the values assigned in two user configurations generated separately by different technical experts on the basis of a common reference.

In at least one embodiment, the method according to the first aspect further comprises:

recording of the first respectively second user configuration as being compliant when each value assigned to a configuration parameter complies with each constraint defined for a value assigned to the considered configuration parameter, the consistency check being performed when the first respectively second user configurations are both recorded as being compliant.

This enables to automatically synchronize the generation of user configurations by different technical experts on the basis of a compliance criterion which have to be met before a consistency check may be performed and to rely on compliant data for the comparison of user configurations performed during consistency check.

In at least one embodiment of the method according to the first aspect, the second piece of information is indicative of a detected non-compliant value in the first modified user data vector and comprises an identifier of a constraint for which a non-compliant value has been found, the method comprising receiving a second validation request for a second version of the first user configuration, performing a third compliance check for the second version of the first user configuration;

sending to the first user terminal a third piece of information indicative of the result of the third compliance check.

An iterative generation of different versions of a user configuration may be performed, while relying on the result of the compliance check for further processing of the user configuration.

In at least one embodiment, the method according to the first aspect further comprises the generation of a validated reference configuration of the product comprising at least one reference data vector in which at least one common value found during the consistency check in the first modified user data vector of the first user configuration and in the second modified user data vector of the second user configuration is assigned to the first configuration parameter in the validated reference configuration.

The determination of configuration parameter values to be used for the product to be manufactured which would be consistent with the recommendations of the different technical experts having worked separately on the different user configurations may be performed automatically.

The synchronization between the different users working on different user configuration may be improved in different ways.

In at least one embodiment of the method according to the first aspect, the first piece of information is indicative of a detected conflict between the first and the second user configuration, the method comprising receiving from at least one user terminal a request for ignoring a conflict detected for a configuration parameter, generating the validated reference configuration by ignoring each configuration parameter for which a conflict is ignored.

In at least one embodiment, the method according to the first aspect further comprises:

receiving a request for deactivating at least a first constraint of a user data vector, registering the at least one constraint as being a deactivated constraint in response to the request, the second compliance check being performed by ignoring a constraint registered as being deactivated.

In at least one embodiment, the method according to the first aspect further comprises:

storing in the database at least one first reference data vector defining at least one constraint to be verified by a value assigned to a configuration parameter of a second reference data vector, sending to at least one user terminal, in response to a request to access to the first user configuration, an instance of the first reference data vector and an instance of the second reference data vector, wherein the second compliance check comprises a compliance check of the constraints defined in the first reference data vector and in the second reference data vector.

According to a second aspect, the present disclosure concerns a method for generating technical data defining a configuration of a product, the method being adapted to be implemented by a user terminal configured to communicate with a computing server, the method comprising:

sending, to a server software application running on the computing server by means of a client software application running on the user terminal in the context of a main software, at least one request identifying a subset of a set of at least one reference data vector stored in at least one database and defining a reference configuration, each reference data vector referring to a technical aspect of the product, at least one reference data vector comprising at least one configuration parameter and at least one constraint with which at least one value assigned to at least one configuration parameter of a user data vector instantiated from one the reference data vector has to comply, receiving by the client software application in response to the request a set of at least one user data vector instantiated from the subset, the set of user data vectors defining a first user configuration, sending to the server software application, by means of a software synchronization module running on the terminal in the context of an auxiliary software, at least one value generated by the auxiliary software and assigned to a parameter created in the auxiliary software and associated to a first configuration parameter of a first user data vector of the first user configuration, receiving by the auxiliary software at least one indicator representative of a result of a first compliance check performed on the at least one value relatively to at least one constraint defined in the main software for the first configuration parameter, sending to the server software application a request for assigning to the first configuration parameter in the main software at least one value generated by the auxiliary software for a parameter associated to the first configuration parameter, receiving by the client software application a piece of information indicative of the result of a consistency check performed by comparing values assigned to the first configuration parameter in a first modified user data vector of the first user configuration and in a second modified user data vector of a second user configuration.

In at least one embodiment, the method according to the second aspect further comprises:

sending to the processing unit a validation request for a modified version of the first user configuration comprising at least one instantiated user data vector modified by assignment of at least one value to a configuration parameter, receiving from the processing unit a first piece of information indicative of the result of a second compliance check performed on the first user configuration to check for at least one modified user data vector whether at least one assigned value complies with at least one constraint defined for that value.

According to a third aspect, the present disclosure concerns a computer program comprising instructions which when executed by a processor of a computing device causes the computing device to perform any of the methods according to the first of second aspect of the present disclosure.

According to a third aspect, the present disclosure concerns a computing server configured to communicate with a plurality of user terminals and comprising a processor, a memory, operatively coupled to the processor, wherein the computing server is configured to perform a method for collaborative generation of technical data defining a configuration of a product, the method comprising:

storing in at least one database a set of at least one reference data vector defining a reference configuration, each reference data vector referring to a technical aspect of the product, at least one reference data vector comprising at least one configuration parameter and at least one constraint with which at least one value assigned to at least one configuration parameter of a user data vector instantiated from one the reference data vector has to comply, instantiating, in response to a first respectively second request received from a first respectively second client software application running on one of the user terminals in the context of a main software, a first respectively second set of at least one user data vector from a first respectively second subset of the reference configuration, the first respectively second set of user data vectors defining a first respectively second user configuration, receiving, from at least one software synchronization module running on one of the user terminals in the context of an auxiliary software, at least one value generated by the auxiliary software and assigned to a parameter created in the auxiliary software and associated to a first configuration parameter of a first user data vector of the first user configuration, performing a first compliance check on the at least one received value relatively to at least one constraint defined in the main software for the first configuration parameter and sending to the software synchronization module at least one indicator representative of a result of the first compliance check, assigning to the first configuration parameter at least one value generated by the auxiliary software for a parameter associated to the first configuration parameter, performing a consistency check by comparing values assigned to the first configuration parameter in a first modified user data vector of the first user configuration and in a second modified user data vector of the second user configuration and sending to the first or second client software application a first piece of information indicative of the result of the consistency check.

According to a third aspect, the present disclosure concerns a user terminal configured to communicate with a computing server and comprising a processor, a memory, operatively coupled to the processor, wherein the user terminal is configured to perform a method for generation of technical data defining a configuration of a product, the method comprising:

sending, to a server software application running on the computing server by means of a client software application running on the user terminal in the context of a main software, at least one request identifying a subset of a set of at least one reference data vector stored in at least one database and defining a reference configuration, each reference data vector referring to a technical aspect of the product, at least one reference data vector comprising at least one configuration parameter and at least one constraint with which by at least one value assigned to at least one configuration parameter of a user data vector instantiated from one the reference data vector has to comply, receiving by the client software application in response to the request a set of at least one user data vector instantiated from the subset, the set of user data vectors defining a first user configuration, sending to the server software application, by means of a software synchronization module running on the terminal in the context of an auxiliary software, at least one value generated by the auxiliary software and assigned to a parameter created in the auxiliary software and associated to a first configuration parameter of a first user data vector of the first user configuration, receiving by the auxiliary software at least one indicator representative of a result of a first compliance check performed on the at least one value relatively to at least one constraint defined in the main software for the first configuration parameter, sending to the server software application a request for assigning to the first configuration parameter in the main software at least one value generated by the auxiliary software for a parameter associated to the first configuration parameter, receiving by the client software application a piece of information indicative of the result of a consistency check performed by comparing values assigned to the first configuration parameter in a first modified user data vector of the first user configuration and in a second modified user data vector of a second user configuration.

According to a another aspect, the present disclosure concerns a method for collaborative generation of technical configuration data of a product, the method being adapted to be implemented by a computing server configured to communicate with a plurality of user terminals, the method comprising:

storing in at least one database a set of at least one reference data vector defining a reference configuration, each reference data vector referring to a technical aspect of the product, at least one reference data vector comprising at least one configuration parameter and at least one constraint with which at least one value assigned to at least one configuration parameter of a user data vector instantiated from one the reference data vector has to comply, instantiating, in response to a first respectively second request received from a first respectively second client software application running on one of the user terminals in the context of a main software, a first respectively second set of user data vectors from a first respectively second subset of the reference configuration, the first respectively second set of user data vectors defining a first respectively second user configuration, receiving from the first respectively second client software application a validation request for a modified version of the first respectively second user configuration comprising at least one user data vector modified by assignment of at least one value to a configuration parameter, performing a compliance check of the first respectively second user configuration by checking for at least one modified user data vector whether at least one assigned value complies with at least one constraint defined for that value;

performing a consistency check by comparing values assigned to a first configuration parameter in a first modified user data vector of the first user configuration and in a second modified user data vector of the second user configuration and sending to the first or second client software application a first piece of information indicative of the result of the consistency check.

sending to the first respectively second client software application a second piece of information indicative of the result of the second compliance check.

The synchronization and consistency between the different technical experts working on the design and/or simulation of a product to be manufactured is implemented at two levels.

Firstly, at a user configuration level, by checking that each user configuration complies with constraints defined for the configuration parameters which are part of that user configuration. This enables to check a user configuration independently of the other user configurations, thus enabling parallel editing of the different user configurations by the different technical experts.

Secondly, at a global level, by checking whether the values assigned to configuration parameter(s) shared between two or more user configurations are consistent. For example, in order to detect the values of a configuration parameter which are common to the two or more user configurations and those which are not common.

According to further aspects of the present description, a computer program is disclosed is computer program. The computer program comprises instructions which when executed by a processor of a computing device causes the computing device to perform any of the methods disclosed therein.

Unless otherwise stated, various aspects and features of the embodiments disclosed herein may be practiced separately or combined together.

BRIEF DESCRIPTION OF THE DRAWINGS

The present disclosure will be better understood and its numerous aspects and advantages will become more apparent to those skilled in the art by reference to the following drawings, in conjunction with the accompanying specification, in which:

FIG. 1A is a schematic representation of a system for collaborative generation of configuration data in accordance with one embodiment.

FIG. 4B shows a flow diagram of an exemplary method for synchronizing a main software MS application and an auxiliary software XS application according to an example embodiment FIG. 5A to 5C shows exemplary embodiments of user interfaces for editing/viewing user configurations and/or reference configurations.

FIG. 6A to 6B shows exemplary embodiments of user interfaces for checking user configurations during compliance and/or consistency checks.

FIGS. 7A, 7B and 7C shows exemplary embodiments of user interfaces for controlling the synchronization of a main software MS and an auxiliary software XS.

DETAILED DESCRIPTION

Figure 1B:
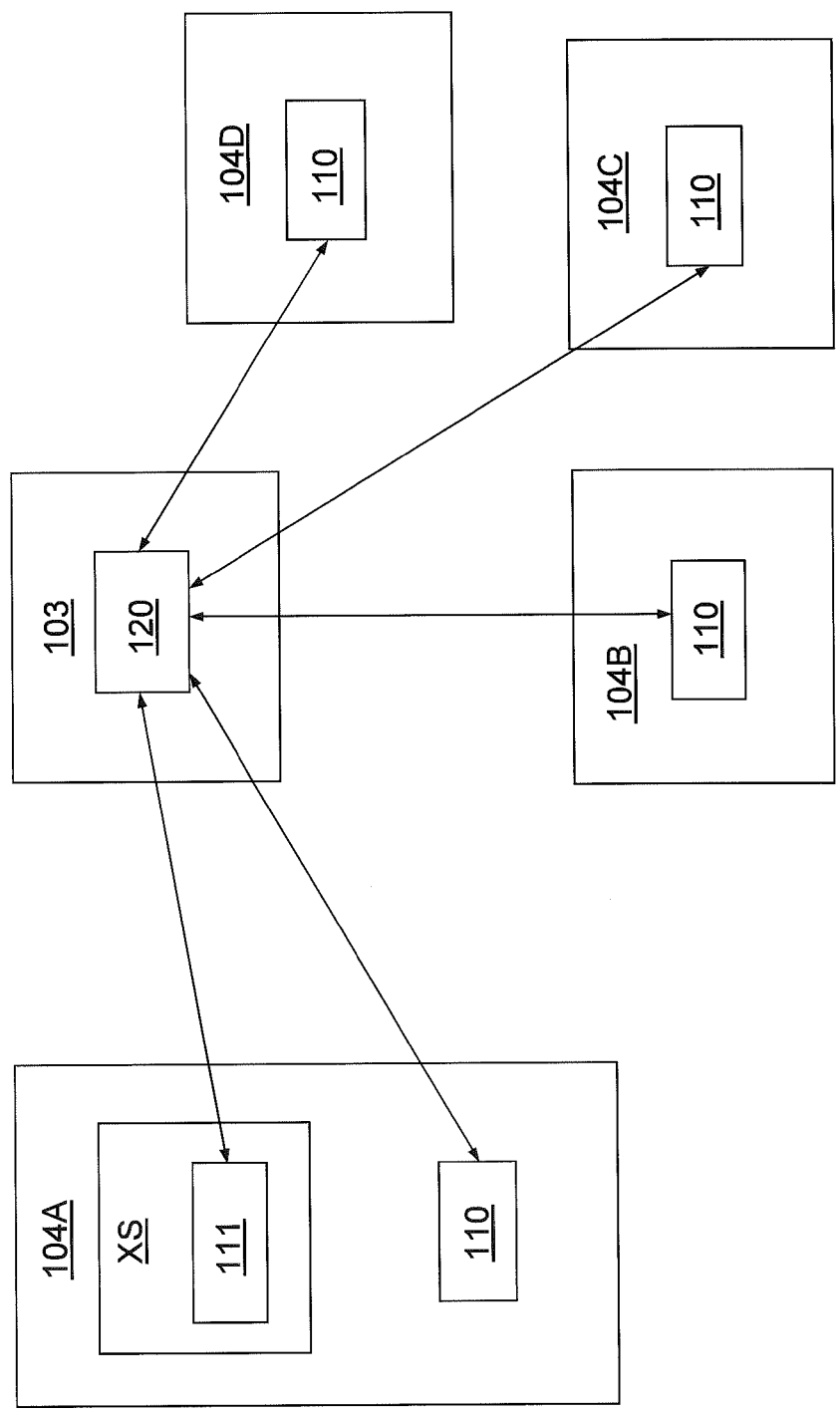
FIG. 1B is another schematic representation of a system for collaborative generation of configuration data in accordance with one embodiment.

The advantages, and other features of the components disclosed herein, will become more readily apparent to those having ordinary skill in the art. The following detailed description of certain preferred embodiments, taken in conjunction with the drawings, sets forth representative embodiments of the subject technology, wherein like reference numerals identify similar structural elements.

In addition, it should be apparent that the teaching herein can be embodied in a wide variety of forms and that any specific structure and/or function disclosed herein is merely representative. In particular, one having ordinary skill in the art will appreciate that an aspect disclosed herein can be implemented independently of any other aspects and that several aspects can be combined in various ways.

The present description is made with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. When implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus, such that the computer program instructions or software code which execute on the computer or other programmable data processing apparatus, implements the functions described herein.

Referring to the figures, FIG. 1 illustrates an exemplary data processing system 100 configured to be used for collaborative generation of technical data defining a configuration of a product to be manufactured. The system 100 may be used to design and/or simulate technical aspects of a product to be manufactured in accordance with the present disclosure.

The data processing system 100 is a computer system which includes a vector database 101, a configuration database 102, a computing server 103 with a processing unit 103A, a plurality of user terminals 104A-D, at least one user directory 105. In the architecture illustrated on FIG. 1, all of the vector database 101, the configuration database 102, the plurality of user terminals 104A-D, the user directory 105, the inference engine 106 are operatively coupled to with one another through the computing server 103.

The computing server 103 may be implemented as a single hardware device or may be implemented on separate interconnected hardware devices connected one to each other by a communication link, with wired and/or wireless segments.

In at least one embodiment, the processing unit 103A comprises a processor 103C, which may be any suitable microprocessor, integrated circuit, etc. According to various embodiments, the processing unit 103 can be configured as a multi-processor computer having multiple processors for providing parallel computing. The processing unit 103A may also comprise, or may be in communication with, computer storage media, such as data memory 103B, capable of storing computer program instructions or software code that, when executed by the processor, causes the processor to perform the method steps as described herein for the computing server 103.

Each of the user terminals may be implemented as a single hardware device, for example in the form of a desktop personal computer (PC), a laptop, a personal digital assistant (PDA), a smart phone or may be implemented on separate interconnected hardware devices connected one to each other by a communication link, with wired and/or wireless segments.

In at least one embodiment, the computing server 103 and the user terminals 104A-104D are implemented as a single hardware device which implements the method steps described herein for the computing server and for the user terminals.

In one or more embodiment, each of the user terminals 104A-104D comprises a processor, which may be any suitable microprocessor, integrated circuit, state machine, etc. According to various embodiments, one or more of the user terminals can be configured as a multi-processor computer having multiple processors for providing parallel computing. One or more of the user terminals may also comprise or may be in communication with, computer storage media, such as data memory, capable of storing computer program instructions or software code that, when executed by the processor, causes the processor to perform the method steps described herein for any of the user terminals.

Embodiments of computer-readable media includes, but are not limited to, both computer storage media and communication media including any medium that facilitates transfer of a computer program from one place to another. As used herein, a "computer storage media" may be any physical media that can be accessed by a computer. Examples of computer storage media include, but are not limited to, a flash drive or other flash memory devices (e.g. memory keys, memory sticks, key drive), CD-ROM or other optical storage, ICD, magnetic disk storage or other magnetic storage devices, memory chip, RAM, ROM, EEPROM, smart cards, or any other suitable medium from that can be used to carry or store program code in the form of instructions or data structures which can be read by a computer processor. The instructions may comprise code in any computer-programming language, including, but not limited to, assembly, BASIC, C, C++, JAVA, JAVSCRIPT, etc.

Each of the user terminals 104A-104D is configured to communicate through a communication link with the computing server 103. In at least one embodiment, the computing server 103 and the user terminals 104A-104D are operatively connected through a communication link, for example through a local area network (LAN), wide area network (WAN) such as the Internet or through any type of communication link or network, either wired or wireless.

As illustrated by FIG. 1B, in at least one embodiment, each of the user terminal 104A-104D may comprise computer program instructions of a client software application 110 that, when executed by the processor of the user terminal, causes the processor to perform the method steps described herein for any of the user terminals. The computing server 103 comprises computer program instructions of a server software application 120 that, when executed by the processor of the computing server 103, causes this processor to perform the method steps described herein for the computing server 103. The client software application 110 and the server software application 120 are configured to be operatively coupled to each other to communicate in a client/server mode through a communication link.

The communication between a client software application 110 and the server software application 120 may use any suitable communication protocol. For example, a HTTP (Hyper Text Transfer) based protocol may be used, such a web service communication protocol like SOAP (Simple Object Access Protocol). Any other protocol may be used, even a proprietary protocol.

The vector database 101 (and respectively the configuration database 102) implements a database management system (ORACLE, MySQL . . . ) and provides an interface for receiving and processing data request, for example request for storing, retrieving, searching, modifying data stored therein. The server software application 120 and/or any of the client software application 110 may be used to send such data request and to process the data received in response to such a request.

The vector database 101 is used for storing different types of data vectors: definition data vectors, instantiated data vectors. A data vector may be defined as a structured set of data or a data structure. Each data vector stored in the vector database 101 is stored in association with a unique identifier identifying this data vector.

A data vector may be used to store information and/or computer data related to an entity represented by this data vector.

Figure 2A:
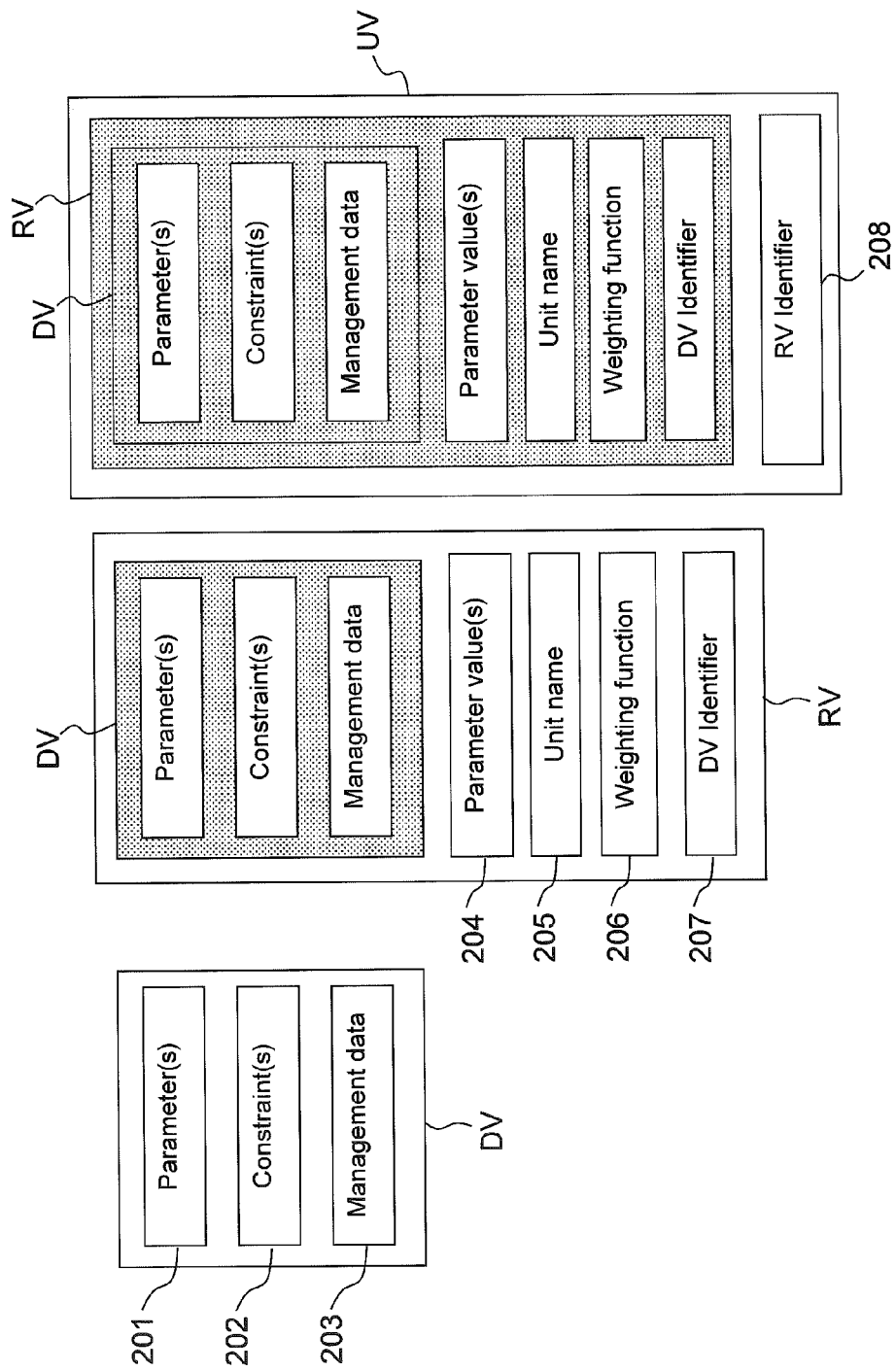
FIG. 2A illustrates exemplary data vectors according to an example embodiment.

FIG. 2A show data vectors in accordance with one embodiment. Different types of data structures will be described below: definition data vector IC and instantiated data vector (either reference data vector RV or user data vector UV).

A definition data vector IC is a data vector that describes and/or refers to a functional/technical aspect of the product PROD to be manufactured. A technical aspect may correspond to any functional set or functional subset of the product PROD. A technical aspect may correspond for example to a component or a group of components of that product, to a sub-system of that product, to a given functionally or a group of functionalities of that product, to an interface of that product, to a property or a group of properties of that product, to a functional constraint for that product, to a manufacturing constraint for that product, etc. In at least one embodiment, a configuration parameter is defined only once in only one definition data vector. Alternatively, a configuration parameter could be defined in two or more definition data vector, for example in case this configuration parameter would be used in different technical contexts.

As illustrating by FIG. 2A, a definition data vector IC comprises at least one configuration parameter 201 and/or at least one constraint 202 to be verified by a value assigned to a configuration parameter of a definition data vector. A constraint 202 defined in a definition data vector may be related to a configuration parameter of the same definition data vector or of another definition data vector. A constraint which is defined in a first definition data vector for a configuration parameter of a second definition data vector defines a link between this first definition data vector and this second definition data vector.

A definition data vector IC may in addition comprise management data 203. The management data 203 of a definition data vector may comprise a vector description (e.g. a text) of the definition data vector, metadata and/or keywords, a version number, a version description (e.g. a text), a user identification and a visibility level. The vector description may be used to search definition data vectors in the database. The vector description may comprise a short explanation or description of the technical aspect which is represented by the definition data vector. The metadata may also be used to search definition data vectors in the database. The metadata may comprises keywords and/or alphanumeric codes and/or tags defining the engineering domain(s) in which a definition data vector may be used and/or defining the technical aspect which is represented by the definition data vector. The version number is an alphanumeric sequence identifying a version of the definition data vector. A version number may be for example "V1" for the initial version, "V2" for the second version, etc.

The version description may comprise a short explanation or description of the current version of the definition data vector and/or may indicate the changes brought to the current version of the definition data vector compared to the previous version. For example, for the initial version, the version description may be "Initial version", and for the second version the version description may be "new configuration parameter added" to indicate that a new configuration parameter has been defined for the definition data vector or "new constraint added" to indicate that a new constraint has been defined.

The user identification is a user name or identifier of a user who has created the definition data vector. The visibility level is a coded information that indicates whether the definition data vector is shared or not and with which users. For example, 3 different visibility levels may be defined: "private" for a definition data vector that can only be accessed by the user who has created the definition data vector, "group" for a definition data vector that can only be accessed by users belonging to the same group than the user who has created the definition data vector, "public" for a definition data vector that can be accessed by all users. The user identification and the visibility level are used in combination to determine which users are allowed to access to the definition data vector and to use them.

A configuration parameter 201 may describe and/or refer to a chemical or physical property of the product PROD, a geometric property of the product, a material used in the product, a manufacturing method usable for the product or one of its component, a chemical or structural composition of the product, a position or location of a component within the product, etc.

In at least one embodiment, a configuration parameter is defined by several definition data. The definition data of a configuration parameter may comprise: a parameter name, a parameter description, a parameter type, a physical quantity name and a unit name.

The parameter name identifies the configuration parameter. The parameter name may be any identification sequence, for example a text, an alphanumeric code, a numeral. The parameter description is used to give some explanation on the configuration parameter, for example an explanation of the technical aspect of the product PROD which is represented by this configuration parameter. The parameter description is for example a text. The physical quantity name of a configuration parameter is the name of a physical quantity which is represented by this configuration parameter. The physical quantity name may be entered for example as a text or an alphanumeric code and selected from a predefined list of physical quantity names A unit name is a name of a default unit in which a value assigned to this parameter has to be defined. The unit name may be entered for example as a text or an alphanumeric code and selected from a predefined list of unit names. The parameter type indicates whether the configuration parameter is a scalar, a matrix, a curve, a surface, etc. The parameter type may be entered for example as a text, an alphanumeric code, a numeral and selected from a predefined list of parameter types.

A constraint 202 in a definition data vector defines a constraint to be verified by a value assigned to a configuration parameter of a data vector instantiated from this definition data vector or by values assigned respectively to several configuration parameters of one or several data vector instantiated from this definition data vector.

In at least one embodiment, a constraint is defined by several definition data. The definition data of a constraint may comprise: a constraint name, a constraint type and a coded instruction. The constraint name identifies the constraint. The constraint name may be any identification sequence, for example a text, an alphanumeric code, a numeral. The constraint type may be entered for example as a text, an alphanumeric code or a numeral and selected from a predefined list of constraint types. In at least one embodiment, the list of predefined constraint types comprises: logical constraint, mathematical constraint, range, non-explicit constraint, other.

The coded instruction may be defined by a set of at least one instructions coded in text (free text) or in a given computing language, like for example pseudo-code, Visual Basic, Java, or any suitable language which is interpretable by an interpretation engine. The coded instruction refers to at least one configuration parameters using the parameter name of each concerned configuration parameter. The coded instruction may define a mathematical and/or logical relationships between one or more configuration parameters, a threshold value under or above which a value assigned to a configuration parameter has to be, a range of values in which a value assigned to a configuration parameter has to fall, a list of possible values for a configuration parameter, or any combination thereof.

For example, let X, Y, Z be respectively a first, second and third configuration parameter, a coded instruction of a mathematical constraint may be defined as "Z=X+Y", "Z=X+150", "Z<X+100" or "Z>25". A coded instruction of a logical constraint may be defined as "IF X<Y, THEN Z=Y−X ELSE Z=X+Y" or "IF X<50 THEN X=30 ELSE X=80". A coded instruction of a range of values may be defined as "X in [50;70]". A non-explicit constraint between three parameters X, Y,Y may be coded as "X−Y−Z" to indicate that these three parameters are dependent but without explicitly indicating the nature of the dependency.

An instantiated data vector RV, UV is an instance of a definition data vector. An instantiated data vector may be a copy of a definition data vector and may also comprise additional data. In at least one embodiment an instantiated data vector comprises the same data than the definition data vector from which it has been instantiated: configuration parameter definition 201 and/or constraint definition 202 and/or management data 203. Two types of instantiated data vector may be created: reference data vector which are instantiated directly from a definition data vector and user data vector which are instantiated from a reference data vector which is itself instantiated from a definition data vector.

At least one value may be assigned to each configuration parameter of an instantiated data vector. An instantiated data vector may thus further comprise a set 204 of at least one value assigned to a configuration parameter of this data vector. A set 204 of at least one value assigned to a configuration parameter may be defined by a single value, a range of values itself defined by a lower and upper bound, a list of single values, a list of range of values, or any combination thereof. Alternatively or in combination, a set 204 of at least one value assigned to a configuration parameter may also be defined by a single value, representing a nominal value for the configuration parameter, and an acceptability range defining the upper and lower threshold in which the value assigned to this configuration parameter has to fall.

An instantiated data vector may in addition comprise a unit code 205 or unit name 205 indicating in which unit a value or a set of values of a given parameter is set.

An instantiated data vector may in addition comprise data 206 defining a weighting function for the values of a set of values assigned to a configuration parameter. A weight allocated to an assigned value according to a weighting function is representative of the technical relevance of said assigned value.

An instantiated data vector may further comprise data 206 defining a maturity level for the set of at least one value(s) assigned to a configuration parameter. A maturity level defined for a set of values is representative globally of the technical relevance and/or technical maturity of the set of values. A maturity level may be defined by discrete values relatively to a predefined scale of values. For example, when a technical expert starts working on a user configuration, he will first define a maturity level of 1 for all values of the configuration parameter in the first versions of the user configuration. When he will have performed at least some simulation or design steps, he may modify the maturity level to the maturity level 2 to indicate that the set of values is more precisely defined and/or that other technical experts may now rely on the assigned values when working on their side on other user configurations. A maturity level of 3 would be for example representative of a set of values which is considered as technically optimal and/or that the technical expert would probably not change anymore.

An instantiated data vector is stored in the vector database 101 in association with an identifier 207 of the definition data vector from which it has been created.

A definition data vector without configuration parameter may be used to define at least one constraint to be verified by a value assigned to one or several configuration parameters of one or several instantiated data vector which are instantiated from a definition data vector different from the constraint data vector. Such a definition data vector may thus be used to define a link between several definition data vectors.

A unit constraint data vector defines a transformation function to be applied to a value assigned to one or several configuration parameters corresponding to a given physical quantity. For example, a configuration parameter represents a length of a component of the product. A unit constraint data vector is defined for each configuration parameter corresponding to the physical quantity "length". A length value may be given in centimeter, meter or kilometer, etc. A default unit is defined for this physical quantity, for example "meter", but a user may define another unit and enter a value in that other unit.

The unit constraint defines transformation function between a value given in a first unit of a physical quantity and a value given in a second unit (default unit) of that physical quantity. For instance, given the physical quantity "length" whose default unit is for example "meter" and whose associated unit list comprises "miles", "feet", etc, there is for each unit usable for a physical quantity a unit constraint (transformation function) defining the relationship between a unit of the unit list and the default unit "meter". This relationship (coded for example as "mile=uc_1 (meter)", "feet=uc_2 (meter)", . . . ) may be defined by a multiplication factor uc_1, uc_2 to be applied to a value entered in that unit in order to convert that value in a value in the default unit. So that when a configuration parameter is given a value in a unit, that value can be automatically converted in a value in another unit when the user selects another unit for the configuration parameter. In one embodiment, in order to manage the unit constraints, for each configuration parameter two values are stored in an instantiated data vector: a first value comprising the value assigned by a user in the unit selected by this user, and a second value calculated from the first value and the multiplication factor defined for the unit selected by the user: this second value is thus the value of the configuration parameter in the default unit. A user will only manage and enter the first value and will not need to take care of the default unit.

The configuration database 102 is used for storing different types of configurations related to the product PROD to be manufactured: reference configurations and user configurations.

Figure 2B:
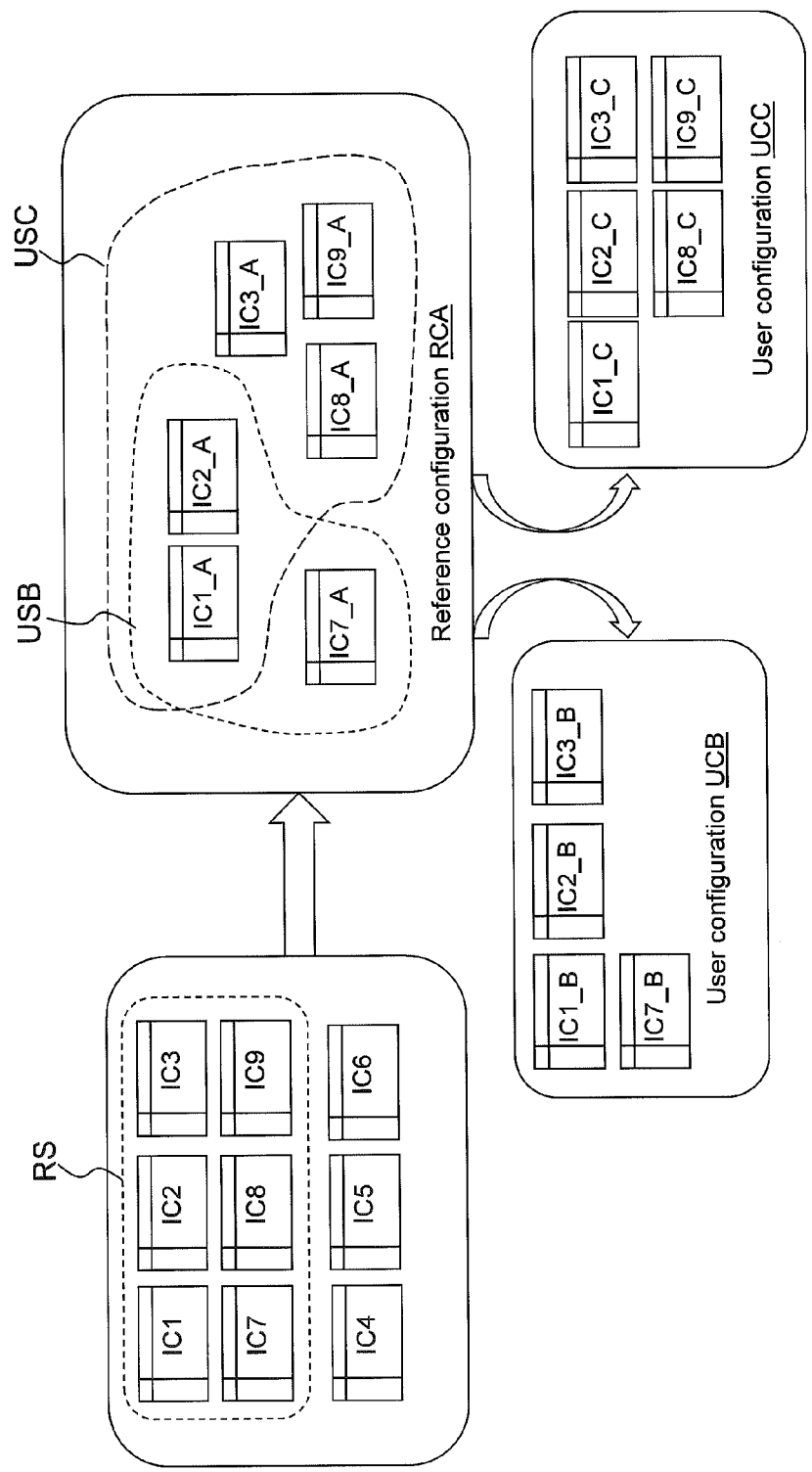
FIG. 2B illustrates exemplary configuration data according to an example embodiment.

FIG. 2B shows a schematic representation illustrating with simplified examples different type of configurations RCA, UCB, UCC that may be stored in the configuration database 102.

A reference configuration RCA is a configuration defined relatively to a set of definition data vectors, which is herein referred to as a reference set RS. As illustrated by FIG. 2B, the reference set RS comprises for example 6 different definition data vectors IC1, IC2, IC3, IC7, IC8, IC9. For each definition data vector belonging to this reference set, one or several data vectors are instantiated to be part of the reference configuration RCA. The reference configuration thus comprises a set of instantiated data vectors instantiated from the definition data vectors of the reference set.

A reference configuration is stored in the configuration database 102 in association with identifiers of instantiated data vectors instantiated from a definition data vector of this reference set. An instantiated data vector which is part of a reference configuration is herein referred to as a reference data vector RV.

As illustrated by FIG. 2B, the reference configuration RCA comprises for example 6 reference data vectors IC1_A, IC2_A, IC3_A, IC7_A, IC8_A, IC9_A instantiated respectively from the definition data vectors IC1, IC2, IC3, IC7, IC8, IC9 of the reference set RS.

A reference configuration may in addition comprise management data such as a description (e.g. a text) and/or metadata. The description may comprise a short explanation or description of the reference configuration. The metadata may comprise keywords and/or alphanumeric codes and/or tags defining the engineering domain(s) and/or the technical aspect(s) concerning the reference configuration.

The configuration database 102 stores for each reference configuration an identification of the reference configuration in association with identifiers of instantiated data vectors being part of the reference configuration. The description and/or metadata of the reference configuration may be stored in the configuration database 102 in association with the identification of the reference configuration.

A user configuration is defined relatively to a reference configuration. A user configuration corresponds to a subset of the reference configuration. More precisely a user configuration corresponds to a subset of set of reference data vectors belonging to the reference configuration. A subset of the reference configuration is herein referred to as a user subset. A user configuration may correspond for example to a specific technical domain/expertise domain, or to a context of use of the product PROD to be manufactured, to a part of the product PROD to be manufactured, etc, while the reference configuration generally covers all of them and is used to implement a synchronization mechanism between the user configurations that are defined on the basis of this reference configuration. It is possible to create as many user configurations as required for the design and simulation of this product.

For each reference data vector belonging to a user subset defining a user configuration, a user data vector is instantiated to be part of this user configuration. The user configuration thus comprises a set of instantiated user data vectors instantiated from the reference data vectors of the user subset.

A user configuration is stored in the configuration database 102 in association with identifiers of user data vectors instantiated from a reference data vector of the corresponding user subset. An instantiated data vector which is part of a user configuration is herein referred to as a user data vector.

For each user data vector of a user configuration there exists a reference data vector in the reference configuration which has been instantiated from the same definition data vector: an association between the user data vector and the reference data vector is stored in the configuration database 102. The user data vector and the reference data vector are said to be linked one to the other.

As illustrated by FIG. 2B, the user configuration UCB comprises for example 3 user data vectors IC1_B, IC2_B, IC7_B instantiated respectively from the user subset USB comprising the reference data vectors IC1_A, IC2_A, IC7_A of the reference configuration RCA and the user configuration UCC comprises for example 5 user data vectors IC1_C, IC2_C, IC3_C, IC8_C, IC9_C instantiated respectively from the user subset USC comprising the reference data vectors IC1_A, IC2_A, IC3_A, IC8_A, IC9_A of the reference configuration RCA.

In at least one embodiment, a user data vector UV is stored in the vector database 101 in association with an identifier 208 of the reference data vector RV of the reference configuration which instantiated from the same definition data vector than this user data vector.

A user configuration may in addition comprise management data such as a description (e.g. a text) and/or metadata. The description may comprise a short explanation or description of the user configuration. The metadata may comprises keywords and/or alphanumeric codes and/or tags defining the engineering domain(s) and/or the technical aspect(s) concerning the user configuration.

The configuration database 102 stores for each user configuration an identification of the user configuration in association with identifiers of instantiated user data vectors being part of the user configuration. The description and/or metadata of the user configuration may be stored in the configuration database 102 in association with the identification of the user configuration.

The user directory 105 is a database for storing user profile and user identification/authentication information. A user profile defines the user rights allocated to a user. The user rights may comprise: rights to create and/or modify and/or delete and/or access a definition data vector or a set or definition data vectors, rights to create and/or modify and/or delete and/or access an instantiated data vector or a set of instantiated data vectors, rights to create and/or modify and/or delete and/or access a reference configuration, rights to create and/or modify and/or delete and/or access a user configuration, rights to process user configurations (compliance check, consistency check). User rights may be defined and managed for a user group.

In at least one embodiment, three levels of access rights are defined. The first (lower) level is named "private": a user having such level of access rights may access, modify and delete only the definition data vectors, the reference and/or user data vectors, reference configurations and/or user configurations which it has himself created. The second (intermediate) level is named "protected": a user having such level of access rights may access, modify and delete only the definition data vectors, the reference and/or user data vectors, reference configurations and/or user configurations which it has himself created or which have been created by another user belonging to the same user group than this user. The third (highest) level is named "public": a user having such level of access rights may access, modify and delete only the definition data vectors, reference and/or user data vectors, reference configurations and/or user configurations which has been created by any user.

Figure 4A:
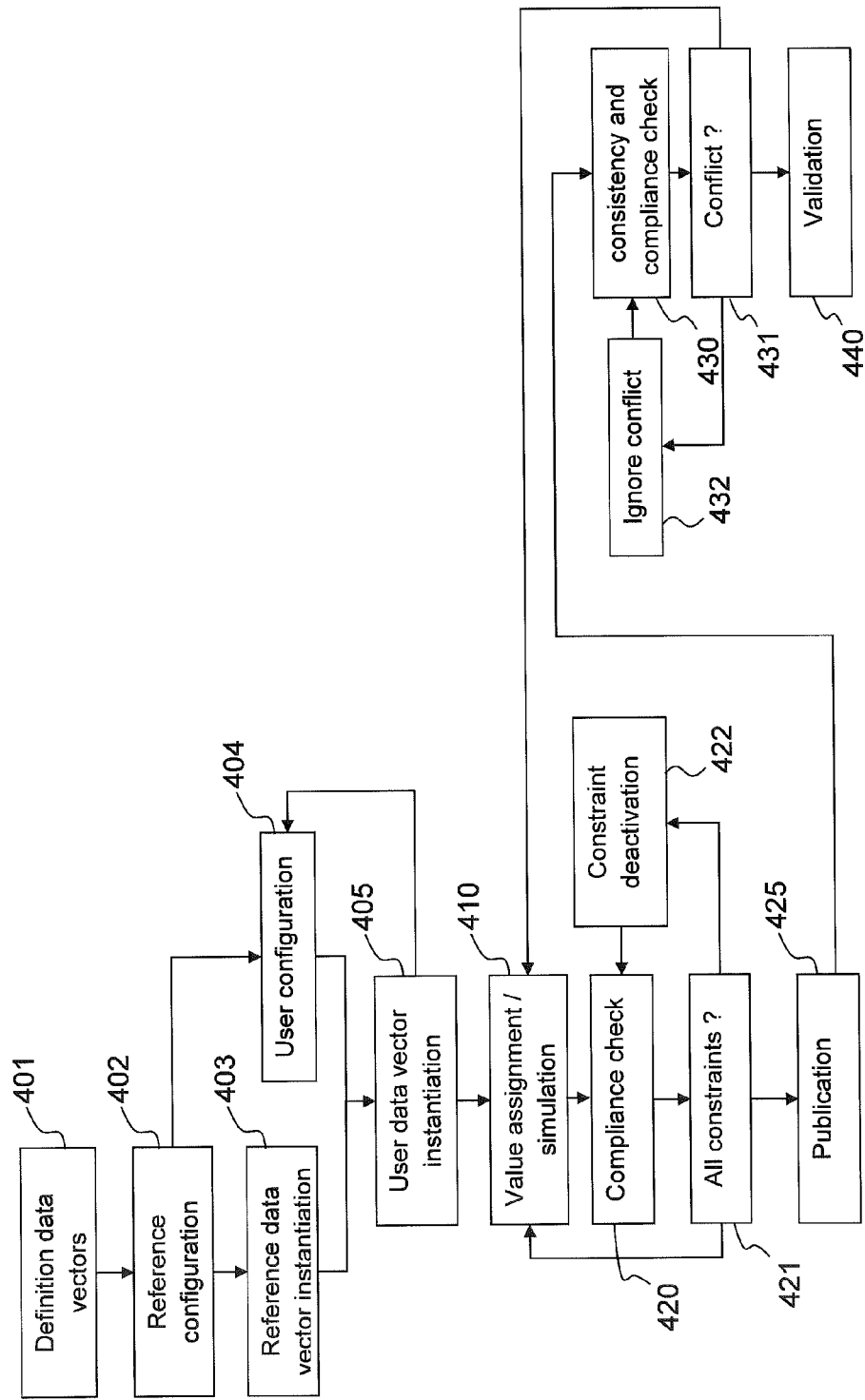
FIG. 4A shows a flow diagram of an exemplary method for collaborative generation of configuration data according to an example embodiment.

FIG. 4A shows a flowchart of a method for collaborative generation of technical data defining a configuration of a product PROD to be manufactured. While the various steps in this flowchart are presented and described sequentially, one of ordinary skill will appreciate that some or all of the steps can be executed in different orders and some or at least some of the steps may be executed in parallel. Further, in one or more embodiments of the invention, one or more of the steps described below can be omitted, repeated, and/or performed in a different order.

Definition Data Vector Generation—Step 401

In the illustrated embodiment, the user UA of the user terminal 104A is a project manager for the definition of a configuration for a product PROD to be manufactured, while the users UB, UC, UD of the user terminal 104B, 104C, 104D are technical experts, each of them having for example its own engineering/technical domain of expertise. Users UA to UD have to cooperate for the generation of a configuration of the product PROD to be manufactured.

A step 401 for generating one or several definition data vectors is implemented. Each of the users UA to UD may use any of the terminals 104A to 104D to generate one or several definition data vectors. Each user UA to UD may be authorized to define definition data vectors depending on his user profile and/or his membership to a user group.

In at least one embodiment, a user, for example user UA, that wants to generate one or several definition data vector use the client software application 110 running on his user terminal 104A to activate a function for creating or modifying a definition data vector.

In response, a user interface is displayed on the screen of the user terminal 104A with at least one data input field for inputting data for defining data vector: configuration parameter 201, constraints 202 and management data 203.

Figure 3A:
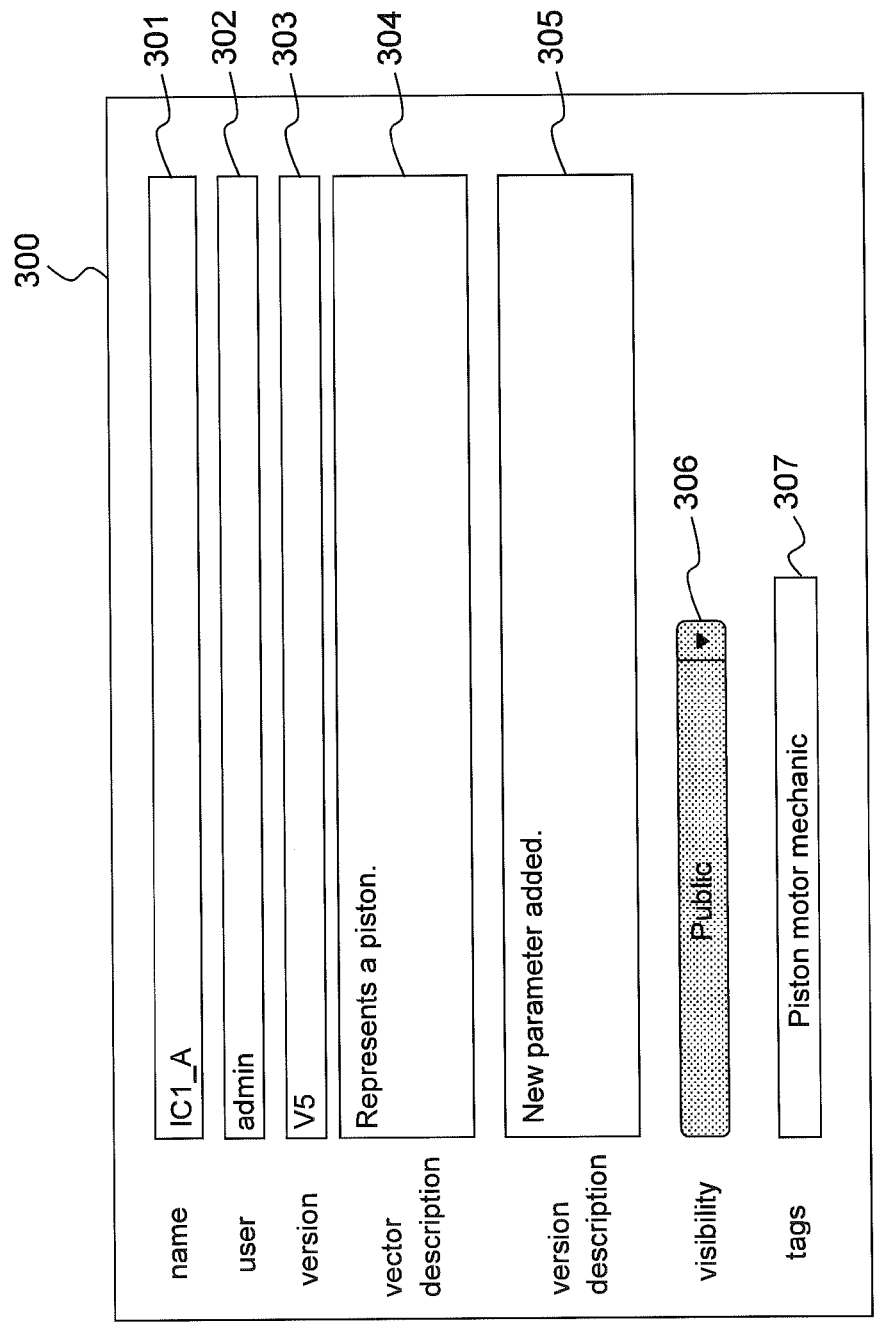
FIGS. 3A, 3B and 3C shows exemplary embodiments of user interfaces for editing definition data vectors.

FIG. 3A illustrates one embodiment of a user interface 300 of a client software application 110 for defining the management data 203 of a definition data vector IC. The user interface comprises several data entry fields: a data entry field 301 for the vector name, a data entry field 302 for the user identification, a data entry field 303 for the version number, a data entry field 304 for the vector description, a data entry field 305 for the version description, a drop down list 306 for selecting a visibility level from a list of predefined visibility levels and a data entry field 307 for tags (metadata and/or keywords).

Figure 3B:
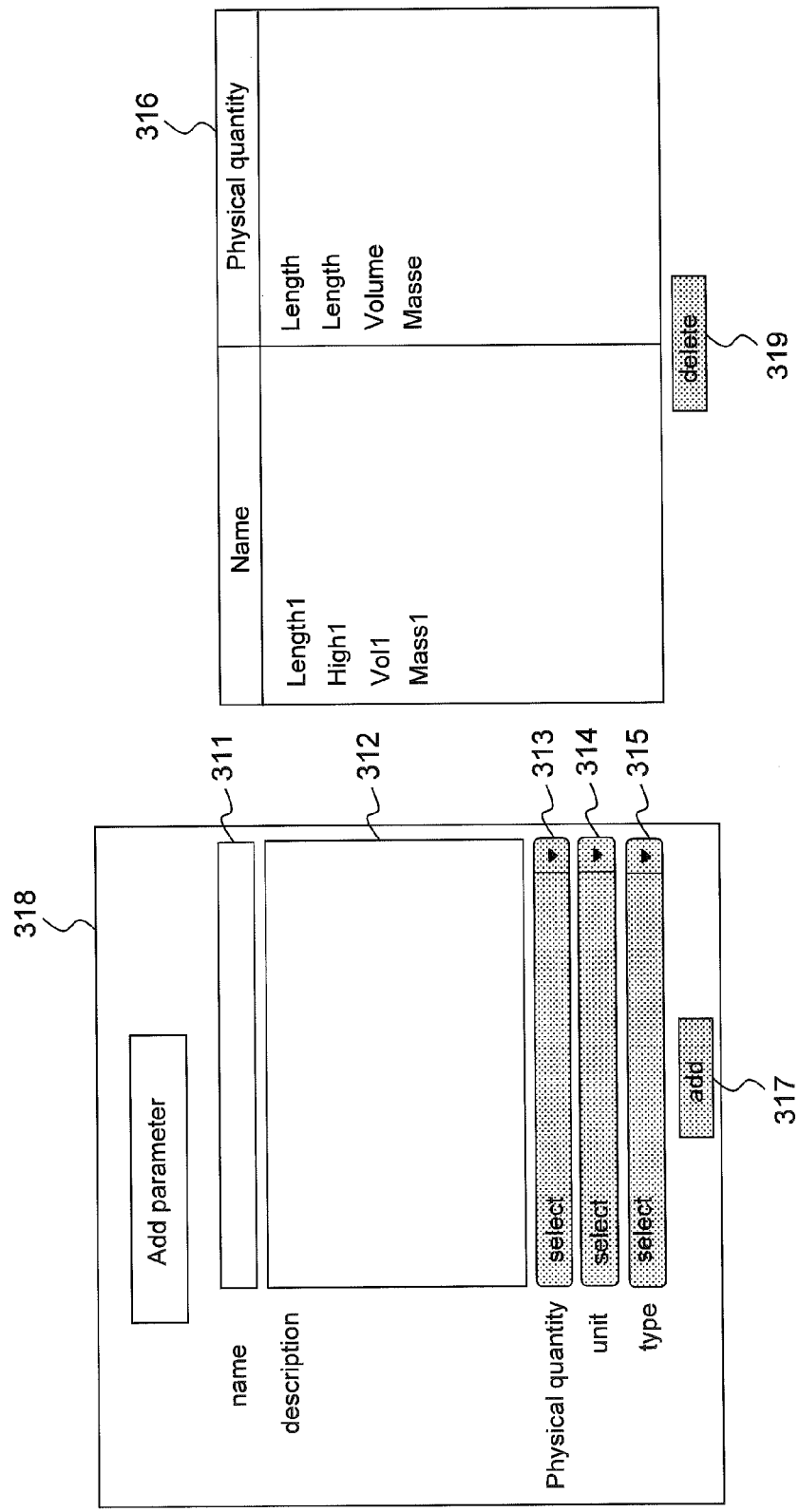

FIG. 3B illustrates one embodiment of a user interface of a client software application 110 for defining a configuration parameter 201. The user interface comprises several data entry fields: a data entry field 311 for the parameter name, a data entry field 312 for the parameter description, a drop down list 313 for selecting a physical quantity name from a list of predefined physical quantity names, a drop down list 314 for selecting a unit name from a list of predefined unit names and a drop down list 315 for selecting a parameter type from a list of predefined parameter types. On the right hand side of the figure, a list 316 of defined configuration parameters is displayed, with respective parameter name and physical quantity name. A selectable button "add" 317 may be clicked on by a user for defining a new configuration parameter: in which case empty data entry fields 311 to 315 are displayed. A selectable button "delete" 319 may be clicked on by a user for deleting a configuration parameter from the configuration parameter list 316.

For example, a configuration parameter which represents a length of a component of the product, when the component is a piston of a motor may be defined by a parameter name "length1", by a parameter description "the outer longitudinal length of the piston", by a physical quantity name "length", by a parameter type "scalar" and by a unit name "centimeter". For example, a configuration parameter which represents a weight of the piston may be defined by a parameter name "mass1", by a parameter description "the global mass of the piston", by a physical quantity name "mass", by a type "scalar" and by a unit name "pound".

Figure 3C:
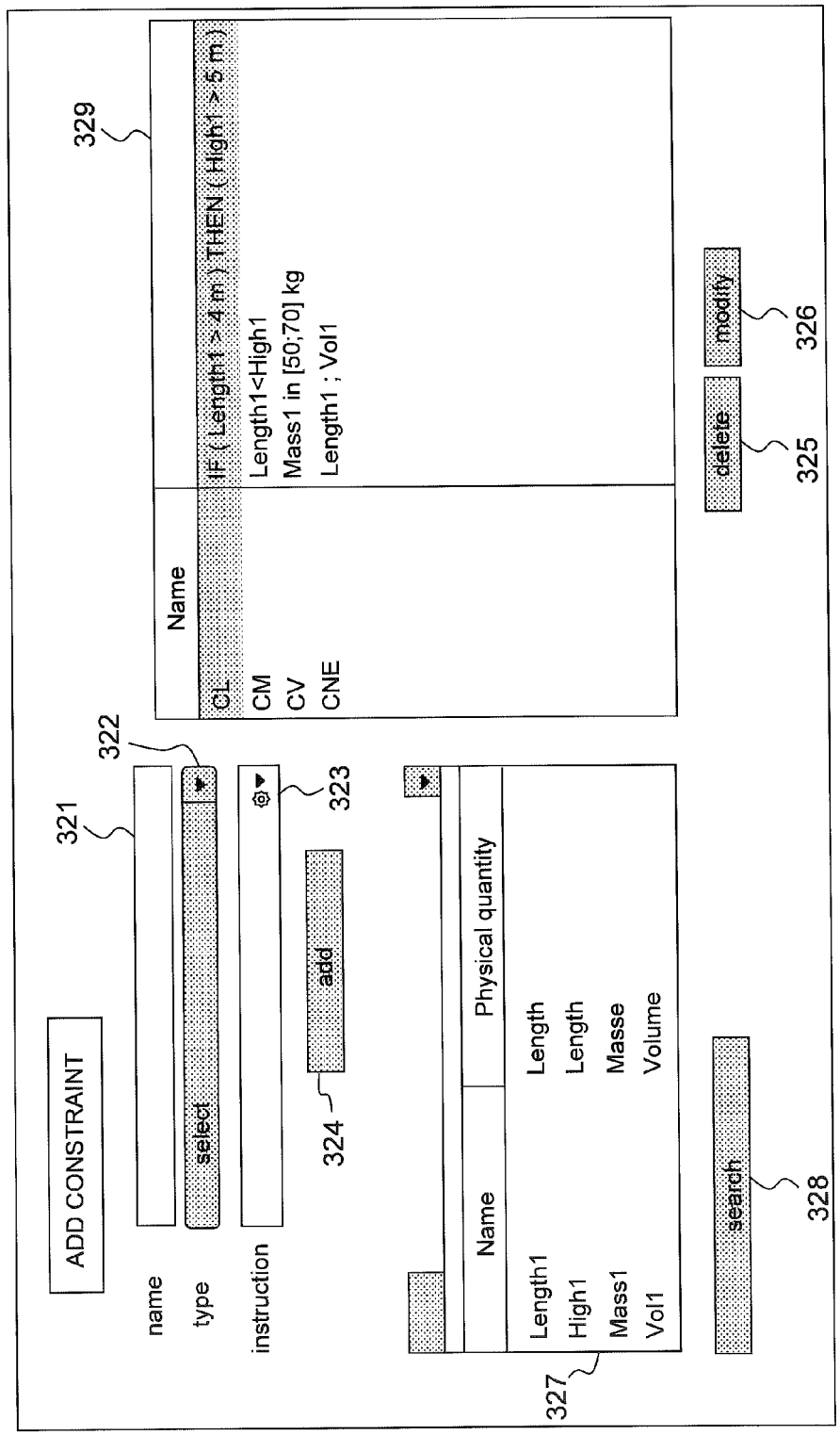

FIG. 3C illustrates one embodiment of a user interface of a client software application 110 for defining a constraint 202. The user interface comprises several data entry fields: a data entry field 321 for the constraint name, a drop down list 322 for selecting a constraint type from a list of predefined constraint types, and an entry field for entering a coded instruction. When typing the coded instruction, a parameter name may be selected in a list 327 of parameter names corresponding to configuration parameters which have been defined in one or several definition data vectors. A selectable button "search" 328 may be clicked on by a user for searching a configuration parameter in a list of configuration parameters of defined definition data vectors. A configuration parameter may be search based on its management data: parameter name and/or parameter description and/or parameter type and/or physical quantity.

On the right hand side of FIG. 3C, a list 329 of defined constraints is displayed, with respective parameter name. A selectable button "add" 324 may be clicked on by a user for defining a new constraint, in which case empty data entry fields 321 to 323 are displayed. A selectable button "delete" 325 may be clicked on by a user for deleting a constraint from the constraint list 329. A selectable button "modify" 326 may be clicked on by a user for modifying a constraint of the constraint list 329, in which case data entry fields 321 to 323 are displayed respectively with the constraint name, constraint type and coded instruction of the selected constraint.

Once a definition data vector has been defined, a request for storing the generated definition data vectors in the vector database 101 is sent by the client software application 110 of the user terminal 104A to the server software application 120 of the computing server 103.

Each of the generated definition data vectors are stored in the vector database 101 together with the inputted data defining each definition data vector: an identifier of the definition data vector, at least one configuration parameter and/or at least one constraint to be verified by a value assigned to a configuration parameter of a definition data vector. For example definition data vectors IC1 to IC10 are generated and stored in the vector database 101.

The step 401 for generating one or several definition data vectors may be repeated several times and/or by different users who have the necessary rights.

Reference Configuration Generation—Step 402

A step 402 for defining (creating or updating) one or several reference configurations for the product PROD to be manufactured is implemented. At each execution of step 402 a user may select a set of at least one definition data vector from which reference data vectors are instantiated and form part of an existing or a new reference configuration.

Each of the users UA to UD may use any of the terminals 104A to 104D to define (either create or modify) one or several reference configurations. Each user UA to UD may be authorized to define reference configurations depending on his user profile and/or his membership to a user group.

In at least one embodiment, a user, for example user UA, that wants to define a reference configuration uses the client software application 110 running on his user terminal 104A to activate a function for defining (creating or updating) a reference configuration.

In response, a user interface is displayed on the screen of the user terminal 104A with at least one data input field for inputting the required data for the reference configuration.

A request for defining (creating or updating) a reference configuration is sent by the user terminal, for example user terminal 104A, and received by the computing server 103. This request identifies a set of definition data vectors on the basis of which the reference configuration has to be created or updated.

In at least one embodiment, the request is a search request comprising a search criterion. A search criteria may comprise keywords and/or classification codes to be searched in the metadata and/or description of the definition data vectors.

In another embodiment, the request comprises an identification of definition data vectors that will form part of the reference configuration to be created or updated. For example, the request comprises a list of definition data vector identifiers.

On receipt of the request for defining (creating or updating) a reference configuration, the computing server 103 identifies the definition data vectors which have to be part of the reference configuration to be created.

In at least one embodiment, the computing server 103 searches for at least one definition data vectors stored in the database 101 which meets the search criteria given in the request. For example the computing server 103 performs a search of definition data vector(s) whose description and/or metadata contain at least one keyword and/or whose metadata classification corresponds to one classification code specified in the request. In another embodiment, the computing server 103 searches for definition data vectors stored in the database 101 whose identifier is specified in the received request.

A result of the search performed by the computing server 103 is sent to the user terminal 104A for validation. This result comprises for example a set of definition data vectors. The user UA may select the definition data vectors that have to be used for generating the reference configuration. In at least one embodiment, the user UA may select a sub-set of the received set. In at least one embodiment, the user UA may send another request when the received set of definition data vectors does not correspond to his needs. One or several additional requests may be sent to the computing server 103 until a set of definition data vectors is constituted and approved by the user UA to generate the reference configuration. The approved set of definition data vectors which has to be used for generating the reference configuration is referred to as the reference set.

Once the user UA has approved a set of definition data vectors (reference set), the computing server 103 instantiates at step 403 for each definition data vector in the approved set a reference data vector. The instantiated reference data vectors form part of the reference configuration.

The computing server 103 stores a reference configuration in the configuration database by storing in association an identification of the reference configuration and identifiers of reference data vectors of the reference configuration. The identification of the reference configuration may be sent to the user terminal 104A.

The step 402 for defining (creating or updating) a reference configuration may be repeated several times by a same user and/or by different users. For the below part of the description, it is assumed that user UA has defined a reference configuration RCA. For example, as illustrated on FIG. 2B, definition data vectors IC1, IC2, IC3, IC7, IC8, IC9 are selected to be part of a reference set and the corresponding instantiated data vector IC1_A, IC2_A, IC3_A, IC7_A, IC8_A, IC9_A are part of the reference configuration RCA.

User Configuration Generation—Step 404

Each of the users UA to UD may use any of the terminals 104A to 104D to define (either create or update) one or several user configurations. Each user UA to UD may be authorized to define user configurations depending on his user profile and/or his membership to a user group.

A step 404 for defining (creating or updating) one or several user configurations is implemented. During execution of step 402 a user may select a set of at least one definition/reference data vector on the basis of which the user configuration has to be created or updated, that is to say, on the basis of which user data vector of the user configuration have to be instantiated.

In at least one embodiment, a user configuration may be defined on the basis of a set of at least one reference data vector of a reference configuration. For example, as illustrated by FIG. 2B, the user configuration UCB is created on the basis of a set USB of reference data vectors comprising the reference data vectors IC1_A, IC2_A, IC7_A. The user configuration UCB will then comprise the user data vector IC1_B, IC2_B, IC7_B respectively instantiated from the reference data vectors IC1_A, IC2_A, IC7_A. For example, as illustrated by FIG. 2B, the user configuration UCC is created on the basis of a set USC of reference data vectors comprising the reference data vectors IC_1A, IC2_A, IC3_A, IC8_A and IC9_A. The user configuration UCC will then comprise the user data vector IC1_C, IC2_C, IC3_C, IC8_C, IC9_C respectively instantiated from the reference data vectors IC1_A, IC2_A, IC3_A, IC8_A, IC9_A.

In at least one embodiment, a user configuration may be defined on the basis of a set of definition data vectors for which no reference data vector has been instantiated in a reference configuration. For example, the definition of the user configuration UCB may be updated by adding the definition data vector IC4 which has not been instantiated in reference configuration RCA. In such a case, a new reference data vector IC4_A would be instantiated in the reference configuration RCA from the definition data vector IC4 and a new user data vector IC4_B would be instantiated in the user configuration UCB from the reference data vector IC4_A.

Thus a user data vector may be instantiated from a reference data vector of a reference configuration or from a definition data vector by instantiating first a reference data vector on the basis of which the user data vector may then be instantiated. Accordingly, there exists always a reference data vector for each instantiated user data vector. A reference data vector may be used to store value(s) of configuration parameter(s) resulting from a comparison of user data vectors instantiated from this reference data vector.

In at least one embodiment, a user, for example user UB, who wants to define a user configuration uses the client software application 110 running on his user terminal 104B to activate a function for defining (creating or updating) a user configuration. In response, a user interface is displayed on the screen of the user terminal 104B with at least one data input field for inputting the data required for defining the user configuration.

A request for defining (creating or updating) a user configuration is sent by a user terminal, for example user terminal 104B, and received by the computing server 103. This request may identify the reference configuration and/or a subset of at least one reference data vector on the basis of which the user data vectors of the user configuration have to be instantiated. This request may also identify a set of at least one definition data vector on the basis of which the user data vector of the user configuration have to be instantiated.

In at least one embodiment, the request is a search request comprising one or more search criteria. A search criterion may comprise keywords and/or codes to be searched in the metadata and/or description of the definition data vectors. In another embodiment, the request comprises an identification of reference and/or definition data vectors based on which the user configuration has to be created or updated. For example, the request comprises a list of reference and/or definition data vector identifiers.

On receipt of the request for defining (creating or updating) a user configuration, the computing server 103 identifies the definition and/or reference data vectors on the basis of which the user configuration has to be created or updated.

In at least one embodiment, the computing server 103 searches for at least one definition or reference data vectors stored in the database 101 which meets the search criteria given in the request. For example the computing server 103 performs a search of definition and/or reference data vector to identify those whose description and/or metadata contain at least one keyword and/or whose metadata classification corresponds to the entered classification code. In another embodiment, the computing server 103 searches for definition and/or reference data vectors stored in the database 101 whose identifier is in the received request.

A result of the search performed by the computing server 103 is sent to the user terminal 104A for validation. This result comprises for example a set of definition and/or reference data vectors. The user UA may select the definition and/or reference data vectors that have to be used for creating and/or updating the user configuration. In at least one embodiment, the user UA may select a sub-set of the received set. In at least one embodiment, the user UA may send another request when the set of definition and/or reference data vectors does not correspond to his needs. One or several additional requests may be sent to the computing server 103 until a set of definition and/or reference data vectors is constituted and approved by the user UA to create or update the user configuration.

The approved set of definition/reference data vectors are used for instantiating user data vectors of the user configuration under definition. In addition, a definition/reference data vector which defines a constraint for a configuration parameter of a definition/reference data vector of the approved set will automatically be inserted in the approved set so that the user configuration which is created or updated based on this approved set will contain all the constraints defined for each configuration parameter in a user data vector of that user configuration.

Once the user UA has approved a set of definition and/or reference data vectors, the computing server 103 instantiates at step 405 for each definition and/or reference data vector in the approved set a user data vector. The instantiated user data vectors form part of the user configuration.

The computing server 103 stores a user configuration UCB or UCC in the configuration database by storing in association an identification of the user configuration and identifiers of user data vectors of the user configuration. The identification of the user configuration UCB or UCC may be sent to the user terminal 104B or 104C. The identification of the user configuration UCB or UCC may also be sent to the user terminal 104A.

The step for defining a user configuration may be repeated several times by a same user and/or different users. In the below description, it is assumed that user UB respectively user UC have defined a user configuration UCB respectively UCC.

For example, as represented on FIG. 2B, the user configuration UCB comprises 3 instantiated user data vectors IC1_B, IC2_B and IC7_B and the user configuration UCC comprises 5 instantiated user data vectors IC1_C, IC2_C, IC3_C and IC8_C and IC9_C. User data vectors IC1_B and IC1_C have been instantiated from the reference data vector IC1_A of the reference configuration RCA. Similarly, user data vectors IC2_B and IC2_C have been instantiated from the reference data vector IC2_A of the reference configuration RCA. Thus user configurations UCB and UCC comprises 2 common user data vectors, in the sense that user data vectors IC1_B and IC1_C have been instantiated from a same reference data vector IC1_A, and that IC2_B and IC2_C have been instantiated from a same reference data vector IC2_A.

While two user configurations UCB and UCC may comprise common user data vectors, the so called common user data vectors IC1_B and IC1_C (and respectively IC2_B and IC2_C) are different instances of a same reference data vector, which means in particular that different values may be assigned in to these user configurations to a configuration parameter common to these user configurations.

FIG. 5A illustrates an exemplary embodiment of a user interface 500 showing a list of instantiated data vectors 501, 502, 503 of a reference configuration. For each instantiated data vector, for example for reference data vector 501, a list of configuration parameters 513 to 516 is displayed and the attributes of those configuration parameters are displayed in tabular form. The same kind of user interface may be used for a user configuration. For each instantiated data vector, a list of constraints 505-508 defined within that instantiated data vector may also be displayed.

FIG. 5B illustrates an exemplary embodiment of a user interface showing, in the upper part of the user interface, a list of configuration parameters 513 to 520 of the same reference configuration. For each configuration parameter, the name of the instantiated data vector in which this configuration parameter is defined is displayed and at least some of attributes of those configuration parameters are displayed in tabular form: set of assigned values, description, etc. In the lower part of the user interface of FIG. 5B, a list of configuration constraints 523 to 529 is displayed. For each constraint, the name of the instantiated data vector in which this constraint is defined is displayed together with the coded instruction of the constraint. The same kind of user interface may be used for a user configuration.

FIG. 5C illustrates an exemplary embodiment of a user interface 500 for comparing a reference configuration RCA with one or more user configurations UCB, UCC defined from this reference configuration RCA. A list of reference data vectors 501, 502, 503, 504 of the reference configuration is displayed. For each reference data vector, for example for reference data vector 501, a list of configuration parameters 513 to 520 is displayed. For each instantiated data vector, a list of constraints 505-508 defined within that instantiated data vector may also be displayed. For each configuration parameter, the set of values (if any) assigned to this configuration parameter in the reference configuration RCA and in the user configuration UCB or UCC is displayed.

Value Assignment and Simulation—Step 410

A step 410 for modifying a user configuration by value assignment is implemented. Each of the users UA to UD may use any of the terminals 104A to 104D to modify one or several user configurations and generate a modified version of a user configuration. Each user UA to UD may be authorized to modify user configurations depending on his user profile and/or his membership to a user group.

In at least one embodiment, a user, for example user UB or UC, who wants to modify a user configuration, uses the client software application 110 running on his user terminal 104B or 104C to activate a function for modifying a user configuration. A request comprising an identification of the user configuration to be modified is sent to the computing server 103.

In response, the computing server 103 retrieves from the configuration database an identification of the user data vectors forming part of the user configuration UCB or UCC to be modified.

A user interface is displayed on the screen of the user terminal 104B or 104C with at least one data input field for a user to input the required data for each user data vector of the user configuration. Each user data vector may be modified by assignment of a set of at least one value to a configuration parameter of this user data vector. A set of values assigned to a configuration parameter may be defined by a single value, a range of values itself defined by a lower and upper bound, a list of single values, a list of range of values, or any combination thereof. Alternatively or in combination, a set 204 of at least one value assigned to a configuration parameter may also be defined by a single value, representing a nominal value for the configuration parameter, and an acceptability range defining the upper and lower threshold in which the value assigned to this configuration parameter has to fall.

In at least one embodiment, a data input field is provided for entering a unit name representing a unit in which a value or a set of values is assigned to this configuration parameter.

In at least one embodiment, a data input field is provided for entering data defining a weighting function for the values assigned to a configuration parameter. A weight allocated to an assigned value according to a weighting function is representative of the technical relevance of this assigned value. The weighting function may be entered by entering a coded instruction representation the weighting function, a curve, a list of output values, one or several ranges of value corresponding to different level of technical relevance, etc. In at least one embodiment, a data input field is provided for entering data defining a maturity level for the set of values assigned to a configuration parameter.

In at least one embodiment, for at least one part of the configuration parameters of the user configuration, the values allocated to those configuration parameters may be generated by a CAD/CAE software tools and imported by the client software application 110 or the server software application 120 in order to be processed at step 420. FIG. 4B which will be described below is a flow diagram illustrating an embodiment of a method for generating by means of a CAD/CAE software tool a modified version of a user configuration for a product to be manufactured.

Once user UB or UC has modified at least one or all user data vectors of the user configuration user configuration UCB or UCC, the user may request to save a modified version of the user configuration UCB or UCC. The computing server 103 then stores the modified user data vector of modified version of the user configuration UCB or UCC in the configuration database. Different versions of a user configuration may be generated and stored in the configuration database. In the different versions of a user configuration, different values may be respectively assigned to a same configuration parameter. A user may thus decide to work on any of those versions for the execution of the following steps.

After completion of the step 410 the user may decide to execute again step 410 in order to further modify the user configuration or to generate another version of the user configuration or may use the client software application 110 running on his user terminal 104B or 104C to activate a function for sending to the computing server 103 a request for requesting a validation of the modified version of the user configuration UCB or UCC. In case a request for requesting a validation of the modified version of the user configuration UCB or UCC is received by the computing server 103, the computing server 103 executes step 420 and performs a compliance check as described below.

In one alternative embodiment, the computing server 103 executes step 420 and performs automatically a compliance check as described below for each saved modified version of the user configuration.

Compliance Check—Step 420

On receipt of the validation request, the computing server 103 performs 420 a compliance check of the modified version of the user configuration UCB, UCC by checking for at least one modified user data vector whether at least one or each value assigned to a configuration parameter complies with at least one constraint defined for that configuration parameter. The constraint to be verified are defined in the definition data vector from which the data vector of the user configuration are instantiated.

One purpose of this compliance check is to provide a method for automatically checking the compliance of a user configuration of the product PROD to be manufactured with respect to all defined constraints.

In at least one embodiment, the compliance check is performed by the computing server 103 of the system, which interprets each defined constraint for each concerned definition data vector and determines whether a value assigned to a parameter complies with that constraint. In one embodiment, at least some computing steps of the compliance check may be performed by means of an external inference engine connected to the computing server 103.

When a set of values is assigned to a configuration parameter, the compliance check is performed for all values belonging to this set of values. For example, when a range of values is assigned to a configuration parameter, the compliance check is performed for all values belonging to this range of values. When an acceptability range is defined for a configuration parameter, the compliance check may be performed for all values belonging to this acceptability range.

In one or more embodiment, the compliance check comprises a calculation of a value or set of values for a configuration parameter when such value(s) can be derived from a constraint concerning this configuration parameter and from a value assigned to another configuration parameter in a modified user data vector of the user configuration UCB, UCC being checked. In at least one embodiment this calculation is performed by an inference engine configured to interpret the constraint and/or to perform an inversion of an instruction (e.g. equation/mathematical formula) of a constraint in order to calculate, on the basis of that instruction, a value of configuration parameter from a value assigned to another configuration parameter.

For example, let X, Y, Z be respectively a first, second and third configuration parameter. When a constraint is defined as "Z=X+Y or Z=X+150", and in case values are assigned to X and Y, then the value assigned to Z may be derived from the defined constraint and from the values assigned to X and Y. In case the constraint would be defined as "X+10<=Z<=X+30" then a range a values [X+10; X+30] could be assigned to Z based on a value assigned to X. Values assigned to a configuration parameter may thus be used to automatically assign values to others configuration parameters.

In case of a non-explicit constraint, the compliance check comprises the generation and display on a user interface of the client software application 110 of a warning to inform the user requesting the compliance check of the presence of the non-explicit constraint and to remind the user to check himself the values assigned to the concerned configuration parameters. In one embodiment, this warning may be generated and displayed only when a configuration parameter concerned by the non-explicit constraint has been modified.

In one or more embodiment, the compliance check is performed for each value assigned to a configuration parameter and/or for each constraint defined in a definition data vector of the user configuration being checked. In one alternative embodiment, the computing server 103 may interrupt the compliance check as soon as one or a given number of non-compliant values is found for one or several configuration parameter.

When the reference configuration from which the user configuration UCB or UCC has been defined comprises a constraint data vector defining at least one constraint to be verified by a value assigned to a configuration parameter of a first user data vector of the user configuration UCB or UCC, the server software application 120 sends in response to a request to modify this first user configuration UCB or UCC, not only the first user data vector, but also an instance of each constraint data vector that concerns a configuration parameter of a user data vector of the user configuration. In such case, the compliance check of the first user data vector comprises a check of the constraints defined in the first user data vector and also those defined each constraint data vector that concerns a configuration parameter of the first user data vector.

On completion of the compliance check, the computing server 103 sends to at least one user terminal a piece of information indicative of the result of the compliance check performed on the modified version of the user configuration. In at least one embodiment this piece of information is sent only to the user terminal used by the user UB or UC who has entered the value assigned the modified user data vectors and/or who is in charge of modifying the user configuration having been checked. In at least one embodiment this information is sent to each user terminal of a user which has the access rights on the user configuration having been checked. In at least one embodiment this information is sent to the user terminal of a user who is the project manager, for example to user UA.

On receipt of the piece of information indicative of the result of the compliance check this information is displayed in a user interface of the client software application 110 of the user terminal having received this information. The information identifies the non-compliant value(s) and/or the concerned configuration parameter and/or the non-verified constraint.

In at least one embodiment, this information is displayed in the form of a message to be read by the recipient user. This information may for example be displayed in a part of the user interface comprising a message or notification list. In at least one embodiment, this information is displayed as a flag and/or visual information and/or short textual information next to the concerned configuration parameters and/or next to the set of values assigned to the concerned configuration parameters and/or next to the non-verified constraint.

After completion of the compliance check, the computing server 103 determines at step 421 whether all constraints are met. In case it is determined at step 421 that all constraints are met, one of steps 425 or 410 may be executed. In case it is determined at step 421 that at least one constraint is not met, the user may decide to execute step 422 in order to deactivate a parameter and/or a constraint or to execute again step 410 in order to provide a new modified version of the user configuration having being checked.

After compliance check of a user configuration, when each value assigned to a configuration parameter of the user configuration complies with each constraint that is not deactivated defined for a value assigned to the concerned configuration parameter, the user configuration is recorded as being compliant.

In at least one embodiment, the consistency and compliance check of step 430 is performed only when the user configurations to be compared are both recorded as being compliant.

FIG. 6A illustrates an exemplary embodiment of a user interface 500 for managing non-compliant configuration parameters in a user configuration UCB, UCC. A list 610 of compliant configuration parameters and a list 620 of non-compliant configuration parameters are displayed together with the instantiated data vector in which this configuration parameter is defined and a set of values assigned to this configuration parameter. A same configuration parameter may be displayed in both lists when some values assigned to a configuration parameter are compliant and other values assigned to this configuration parameter are not compliant with at least one constraint. A list 630 of constraints may also be displayed.

Deactivation of a Constraint—Step 422

The deactivation of a constraint may be performed at different stages. The deactivation of a constraint may be performed during or after step 410 once a user has generated a modified version of a user configuration. The deactivation of a constraint may be also performed after step 420, that is to say after receipt of the piece of information indicative of the result of a first compliance check, in which case the computing server 103 will update the piece of information indicative of the result of the compliance check to take into account the deactivation of the constraint.

The deactivation of a constraint may be performed in response to a user deactivation request.

In at least one embodiment a user UB or UC may use the client software application 110 running on his user terminal 104B or 104C to activate a function for sending a request for deactivating one or more constraint of an instantiated user data vector. On receipt of the request, the computing server 103 registers the concerned constraint as being a deactivated. For example a flag value indicative of a deactivated constraint is recorded in association with the data 202 defining the concerned constraint.

After completion of step 422, the compliance check performed by the computing server 103 at step 420 is performed by ignoring each constraint registered as being deactivated. In at least one embodiment a user configuration may be recorded as being compliant when all non-verified constraint are deactivated.

In case there is at least one constraint registered as being deactivated, the execution of step 421 is modified as follows. The computing server 103 determines at step 421 whether all constraints are met. In case it is determined at step 421 that all constraints are met, step 425 or 410 may be executed. In case it is determined at step 421 that at least one constraint is not met, the computing server 103 determines whether this constraint is registered as being deactivated or whether the concerned configuration is registered as being deactivated.

In case the non-verified constraint is deactivated, the non-verified constraint is ignored and step 425 or 410 may be executed after step 421. In at least one embodiment, the piece of information indicative of the result of the compliance check may comprises in such case an information on the deactivated constraint.

In opposite case, when a non-verified constraint is not deactivated, the user may decide to execute step 422 in order to deactivate another constraint or to execute again step 410 in order to provide a new modified version of the user configuration having being checked. The execution of step 425 and followings may in this case be prohibited until the compliance check is successful, that is to say until all constraints are met or at least all non-verified constraint are deactivated.

Publication of a User Configuration—Step 425

When all non-deactivated constraints are met, the user configuration for which the compliance check has been successfully performed is registered as being validated. In step 425, a user configuration is registered as being validated, the user configuration is published, that is to say, a version of the user configuration is shared between several users that may have access to the values assigned to the configuration parameters of the user configuration in the published version available for further processing, namely for consistency check with other user configurations which have been generated from the same reference configuration. The user configuration may still be updated and other versions created and/or updated for this user configuration with different values assigned to configuration parameters: these other versions will not be shared with other users until the user who has defined these versions requests explicitly to publish at least one of these versions. This enables the user to continue to work on this user configuration while allowing other users to have access to at least a version of this user configuration and to work on the values assigned therein.

In one embodiment, when a constraint has been ignored at step 422, this information is also shared during step 425 with other users when the publication of the user configuration occurs.

Consistency and Compliance Check—Step 430

After publication of the modified version of at least two user configurations UCB and UCC defined on the basis of a same reference configuration and having common user data vectors, that is to say, user data vectors instantiated from common reference data vectors of this reference configuration, the computing server 103 performs 430 a consistency check by comparing the two user configurations UCB and UCC. In the above example, user configurations UCB and UCC are both defined on the basis of 2 common reference data vectors IC1_A and IC2_A: the modified user data vector instantiated respectively from one of this reference data vectors IC1_A, and IC2_A in the user configurations UCB and UCC are compared.

The comparison comprises a comparison of a first modified user data vector of the first user configuration UCB with a second modified user data vector of the second user configuration UCC which is instantiated from the same reference data vector than the first modified user data vector in order to find for each configuration parameter at least one common assigned value and/or to identify non-common assigned values. For example, when a first data vector IC1_B is instantiated from the reference data vector IC1_A in the first user configuration UCB and a second data vector IC1_C is instantiated from the same reference data vector IC1_A in the second user configuration UCC, then for one or more configuration parameter CP1 of the reference data vector IC1_A, the set of values assigned to this configuration parameter CP1 in the first data vector IC1_B and the set of values assigned to this configuration parameter CP1 in the second data vector IC1_C are compared in order to find at least one common value and/or to identify non-common assigned values. On one embodiment, when acceptability ranges are defined for a configuration parameter, the comparison comprises a comparison of the acceptability ranges defined for the configuration parameter in order to find at least one common value and/or to identify non-common values in the acceptability ranges.

In one or more embodiment, the consistency check is performed for each common reference data vectors IC1_A and IC2_A and/or for each configuration parameter of these common reference data vectors. In an alternative embodiment, the computing server 103 may interrupt the consistency check as soon as no common value is found for one or a given number of configuration parameters of a common definition data vector.

One purpose of this consistency check is to find automatically a configuration of the product PROD to be manufactured that complies with the recommendations of two or more users for the same technical aspect represented by one or several reference data vector IC1_A and IC2_A. For example, user UB, who is an expert in a first engineering domain, may provide different values for a given configuration parameter than user UC, who may be an expert in a second different engineering domain.

During the execution of the consistency check, a conflict may be detected between the two user configurations UCB and UCC in case for a given configuration parameter of a common reference data vector no common value can be found. One or several conflicts may be detected for one or several configuration parameters.

In at least one embodiment, whenever during consistency check, the value comparison between two user configuration parameters, from the same reference data vector, that have different units is done by first converting each value of a configuration parameter which is not entered in the default unit to a value in the default unit and then by comparing values in the default unit. For instance, if a configuration parameter "Length1" has a first value "2" entered in meters in a first user configuration and a second value "5" in inches in a second user configuration, then the second value in inches is converted in meters for comparing the two values during consistency check.

On completion of the consistency check, the computing server 103 sends to at least one user terminal 104A, 104B or 104C a piece of information indicative of the result of the consistency check. When user UA is the project manager, this piece of information is useful to warn him of a presence/absence of conflict between the two user configurations UCB and UCC. This piece of information is useful to user UB or UC to warn him of a presence/absence of conflict between the two user configurations UCB and UCC and/or to indicate whether a user configuration will need to be further modified.

The piece of information indicative of the result of the consistency check identifies the configuration parameter for which a conflict has been detected and/or the non-common values assigned to this configuration parameter.

On receipt of the piece of information indicative of the result of the compliance check, this piece of information is displayed in a user interface of the client software application 110. In at least one embodiment, this piece of information is displayed in the form of a message to be read by the recipient user. This piece of information may for example be displayed in a part of the user interface comprising a message or notification list. In at least one embodiment, this piece of information is displayed as a flag and/or visual information and/or short textual information next to the concerned configuration parameters and/or next to the set of values assigned to the concerned configuration parameters.

In at least one embodiment, a compliance check may be performed during step 430, before or after the consistency check, on the reference configuration on request for example of a user UA (for example, a project manager). This compliance check may be performed either on a validated reference configuration generated during step 440 or on a modified version of the reference configuration generated by this user UA by assignment of value(s) to configuration parameter(s) of reference data vector(s) belonging to this reference configuration. The compliance check of the reference configuration is performed in the same manner as the compliance check performed on a user configuration at step 420.

During this compliance check, all the constraints could be checked, whether they are have been deactivated or not by one user UB or UC. This enables the user UA to have a clear view on the constraint for which there are non-compliant value of configuration parameter. In at least one embodiment, the user UA may decide deactivate one or more constraints when doing a compliance check: this deactivation of constraint is performed as described for a user configuration in step 422.

After completion of the consistency check, the computing server 103 determines at step 431 whether there is at least one conflict between the two user configurations. In case it is determined at step 431 that there is no conflict, the step 440 can be executed. In case it is determined at step 431 that there is at least one conflict, a user, for example user UA having defined the reference configuration or any other user having the necessary rights, may decide to execute step 342 in order to ignore at least one conflict or to execute again step 410 in order to provide a new modified version of the user configuration having being checked.

FIG. 6C illustrates an exemplary embodiment of a user interface 500 for managing conflicts between user configurations UCB, UCC. A list 640 of configuration parameters for which at least one conflict has been detected and a list 650 of configuration parameters for which no conflict has been detected are displayed together with the name of instantiated data vector in which this configuration parameter is defined and values assigned to this configuration parameter. A list 660 of constraints may also be displayed. In the list 640 of configuration parameters for which at least one conflict has been detected a piece of information may be displayed in association with each configuration parameter in order to indicate whether the concerned configuration parameter has been ignored or not.

Ignore Conflict—Step 432

The step 432 may be performed in response to a user request for putting on hold or ignoring one or several conflicts detected during the consistency check of step 430.

In at least one embodiment a user UA, UB, UC may use the client software application 110 running on his user terminal 104A, 104B, 1040 to activate a function for sending a user request for ignoring one or several conflicts detected during consistency check. This user request may identify the concerned configuration parameter, and/or the concerned user configurations and/or the concerned set of values. On receipt of the request, the computing server 103 registers the concerned configuration parameter as being deactivated for the purpose of the consistency check. For example a flag value indicative of a conflict to be put on hold and ignored during consistency check is recorded in association with the concerned configuration parameter.

After execution of step 432, the consistency check of step 430 is performed by ignoring a conflict concerning a configuration parameter recorded as being deactivated for the purpose of the consistency check and/or by ignoring configuration parameter to which no value has been assigned.

In case there is at least one ignored conflict, the execution of step 431 is modified as follows. The computing server 103 determines at step 431 whether there is at least one conflict between the two user configurations.

In case it is determined at step 431 that there is no conflict, step 440 may be executed to generate a validated reference configuration. Step 410 may also be executed after step 431 to update a user configuration. On opposite case, when at least one detected conflict is detected which is not to be ignored, the user may decide to execute step 432 in order to ignore another detected conflict or to execute again step 410 in order to provide a new modified version of the user configuration having being checked.

In case the detected conflict(s) is (are) to be ignored, step 425 or 410 may be executed after step 421. In at least one embodiment, the piece of information indicative of the result of the consistency check may comprise in such case an information on an ignored conflict for a given configuration parameter and/or on a configuration parameter being deactivated for the purpose of the consistency check.

Validation of a Reference Configuration—Step 440

When there are only ignored conflicts and/or no conflicts between different user configurations generated from a same reference configuration, a validated reference configuration may be generated.

For each configuration parameter of a reference data vector of a reference configuration, a set of validated values is generated. This set of validated values comprises the values assigned to this configuration parameter which are common to all user data vectors instantiated from this reference data vector in the different user configurations generated from this reference configuration and/or common values of the acceptability ranges defined for this configuration parameter.

The generation of a validated configuration may comprise the generation of a modified reference data vector from its linked user data vectors in the different user configurations being compared: in the generated reference data vector one or several common values found during the consistency check are assigned to the concerned configuration parameter.

In at least one embodiment, the weighting function defined for a set of values assigned to a configuration parameter in one or several user data vectors are used to determine a weighting function for the set of validated values assigned to this configuration parameter in the reference data vector. The weight assigned in the reference data vector to a common value of the set of validated values is for example calculated as the mean of the weights assigned to this value in the user data vectors instantiated from this reference data vector. In at least one embodiment, the determination of the reference data vector comprises a determination of a set of at least one common value of highest technical relevance based the weighting function defined for the set of values assigned to the concerned configuration parameter in the user data vectors.

In at least one embodiment, a user, for example user UA may decide to freeze at least some part of reference data vectors of the reference configuration. User UA uses the client software application 110 running on his user terminal 104A, 104B, 104C to activate a function for sending a request for prohibiting the modification of the instances of a given reference data vector. As a result each of the user data vector which has been instantiated from this reference data vector is frozen in each user configuration to whom this user data vector belongs: the modification of those user data vector is prohibited.

With reference to FIG. 4B, a flow diagram illustrates an embodiment of a method for generating by means of a CAD/CAE software a modified version of a user configuration for a product to be manufactured. While the various steps in this flowchart are presented and described sequentially, one of ordinary skill will appreciate that some or all of the steps can be executed in different orders and some or at least some of the steps may be executed in parallel. Further, in one or more embodiments of the invention, one or more of the steps described below can be omitted, repeated, and/or performed in a different order.

The CAD/CAE software will be referred to as an auxiliary software XS as compared to the main software represented by the client software applications 110. The server software application 120 comprises a first communication unit U1 for communicating with one or several auxiliary software(s) XS and a second communication unit U2 for communicating with one or several client software applications 110.

As illustrated by FIG. 1B, the data generated and/or function performed (e.g. definition of user/reference configuration, instantiation of user/reference data vector, value assignment, compliance check, compliance check, etc) by one of the client software applications 110 or by the server software application 120 communicating with a client software application 110 are said to be generated or respectively performed in the context of the main software MS. While the data generated and/or function performed (e.g. creation of parameter, definition of association, generation and assignment of values for parameter, simulation and/or design step) by the auxiliary software XS and/or the software synchronization module 111 of the auxiliary software XS or by the server software application 120 communicating with the software synchronization module 111 are said to be generated or respectively performed in the context of the auxiliary software XS.

The auxiliary software XS may be any computer aided software for industrial design and modelling, digital simulation, computation, generation, validation and/or optimization of product parameters and/or knowledge management, etc.

The auxiliary software XS may be executed on a user terminal connected to the computing server 103, for example on any of the user terminals 104A to 104D. Different auxiliary software may be used by the different user of user terminals 104A to 104D and/or different instance of a same auxiliary software may be used by the different users of user terminals 104A to 104D: each auxiliary software may be configured to communicate with the server software application 120.

The auxiliary software XS is a software that is executed independently from any of the client software applications 110 executed on the user terminals 104A to 104D. For example, a user of a user terminal 104A to 104D may alternately and/or in parallel use, on one side, the client software applications 110 to define reference configuration(s), user configuration(s), configuration parameter(s), constraint(s) and perform any of the steps described by reference to FIG. 4A and, on the other side, the auxiliary software XS to generate new configuration parameter value(s) to be imported into the main software MS to be assigned to configuration parameters of user data vectors of a user configuration.

For the below description, it is assumed by way of example that the auxiliary software XS is run on user terminal 104B and that the user of the auxiliary software XS is for example user UB.

The auxiliary software XS comprises a software synchronization module 111 for synchronization of steps performed within the auxiliary software XS and steps performed within the main software, in particular steps 401 to 440. The software synchronization module 111 is executed within the context of auxiliary software XS and is configured to communicate with the server software application 120 run on the computing server 103. The communication between the auxiliary software XS and the server software application 120 may use any suitable communication protocol. For example, a HTTP (Hyper Text Transfer) based protocol may be used, such a web service communication protocol like SOAP (Simple Object Access Protocol). Any other protocol may be used, even a proprietary protocol. In at least one embodiment, the software synchronization module 111 is implemented as a plug-in of the auxiliary software XS.

The software synchronization module 111 is configured to send data and/or requests to the server software application 120 running on the computing server 103 and to receive and process data received from the server software application 120. The software synchronization module 111 is for example configured to import into the auxiliary software XS data generated by the main software and to export toward the main software data generated by the auxiliary software XS. The software synchronization module 111 is configured to display user interfaces on the screen of the user terminal, for example within the user interface of the auxiliary software XS to enable interaction with a user of the user terminal on which the auxiliary software XS is run.

In step 450, a connection between the server software application 120 and the auxiliary software XS is established by means of the software synchronization module 111. The connection may be established automatically on start of auxiliary software XS or on request from the user UB of the auxiliary software XS.

A request is sent by the software synchronization module 111 of the auxiliary software XS to the server software application 120. In response, a list of user/reference configurations that have been defined by means of the main software MS is sent to the auxiliary software XS. On receipt of the response, a user interface of the auxiliary software XS is displayed on the screen of the user terminal 104B with the list of user and/or reference configurations to enable user UB to select a user configuration and/or reference configuration from a list of configurations.

User UB selects a user or reference configuration, for example a user configuration for which he wants to perform some design and/or simulation by means of the auxiliary software XS. By way of example, it is assumed that user configuration UCB is selected by user UB.

For a selected user configuration, different operations may be performed. At the end of step 450, user UB may decide to execute one of steps 460 or 470.

In step 460, associations between configurations parameters of the main and auxiliary software XS are defined (created or updated). During step 460, user UB activates a function for creating or updating associations between parameters. For consistency purposes, an association may be created only between two parameters representing the same physical quantity. An association defines a one-to-one relationship between the two parameters: one configuration parameter defined in the main software MS and one parameter defined in the auxiliary software XS.

A request is sent by the auxiliary software XS to the server software application 120 with an identification of the selected user configuration UCB. In response, a list of configuration parameters of the selected user configuration UCB is sent to the auxiliary software XS. On receipt of the response, a user interface of the auxiliary software XS is displayed on the screen of the user terminal 104B with the list of configuration parameters that enables user UB to control the definition of associations between configuration parameters defined by means of the main software and parameters defined by means of the auxiliary software XS.

The creation or update of associations between parameters may be performed either automatically or under control of the user UB.

When the association process is performed automatically, user UB activates a function for requesting the automatic creation of associations between parameters. In response, a list of automatically defined associations is generated. In at least one embodiment, the automatic generation of associations is performed by the software synchronization module 111 of the auxiliary software XS. Once the associations are generated, a user interface is displayed on the screen of the user terminal 104B with the list of created associations.

When the association process is performed automatically, an association is created between two parameters having the same name: the configuration parameter defined within the main software and the associated parameter defined within the auxiliary software XS will have the same name. In at least one embodiment, when a parameter already exists in the auxiliary software XS with the same name than a configuration parameter defined within the main software, then an association is automatically created between those two parameters.

When the association is performed under control of the user, user UB activates a function for requesting the manual creation of associations between configurations parameters. In response, a user interface is displayed on the screen of the user terminal 104B: this user interface enables the user to select a configuration parameter from a list of configuration parameters defined in the main software and to enter a parameter name for a parameter in the auxiliary software XS to be associated to the selected configuration parameter.

When the association is performed under control of the user UB, user UB has to enter for each concerned configuration parameter within the main software a name of the parameter within the auxiliary software XS to be associated with the former one. The parameter within the auxiliary software XS may be an existing parameter (i.e. already created or instantiated in the auxiliary software XS) or a parameter to be created or instantiated within the auxiliary software XS.

The user UB may request to create associations only for some of the configuration parameters or for all of the configuration parameters of the selected user configuration.

At the end of step 460, a user interface is displayed with a list of at least one configuration parameter (if any) for which an association has been defined and a list of at least one configuration parameter (if any) for which no association has been defined.

Step 460 may be repeated any number of times to create new association or update existing association between configuration parameters. After execution of step 460, user B may decide to perform step 470 or step 480.

Association data defining associations between parameters may be stored in a data file associated with the auxiliary software XS, for example the data file used for storing a model defined within the auxiliary software XS. The format used for storing this associations may be any suitable format: text, XML or any proprietary coding format that would be specifically recognized/interpretable by the auxiliary software XS. Association data may comprise the identifiers and/or names of associated parameters.

Figure 7A:
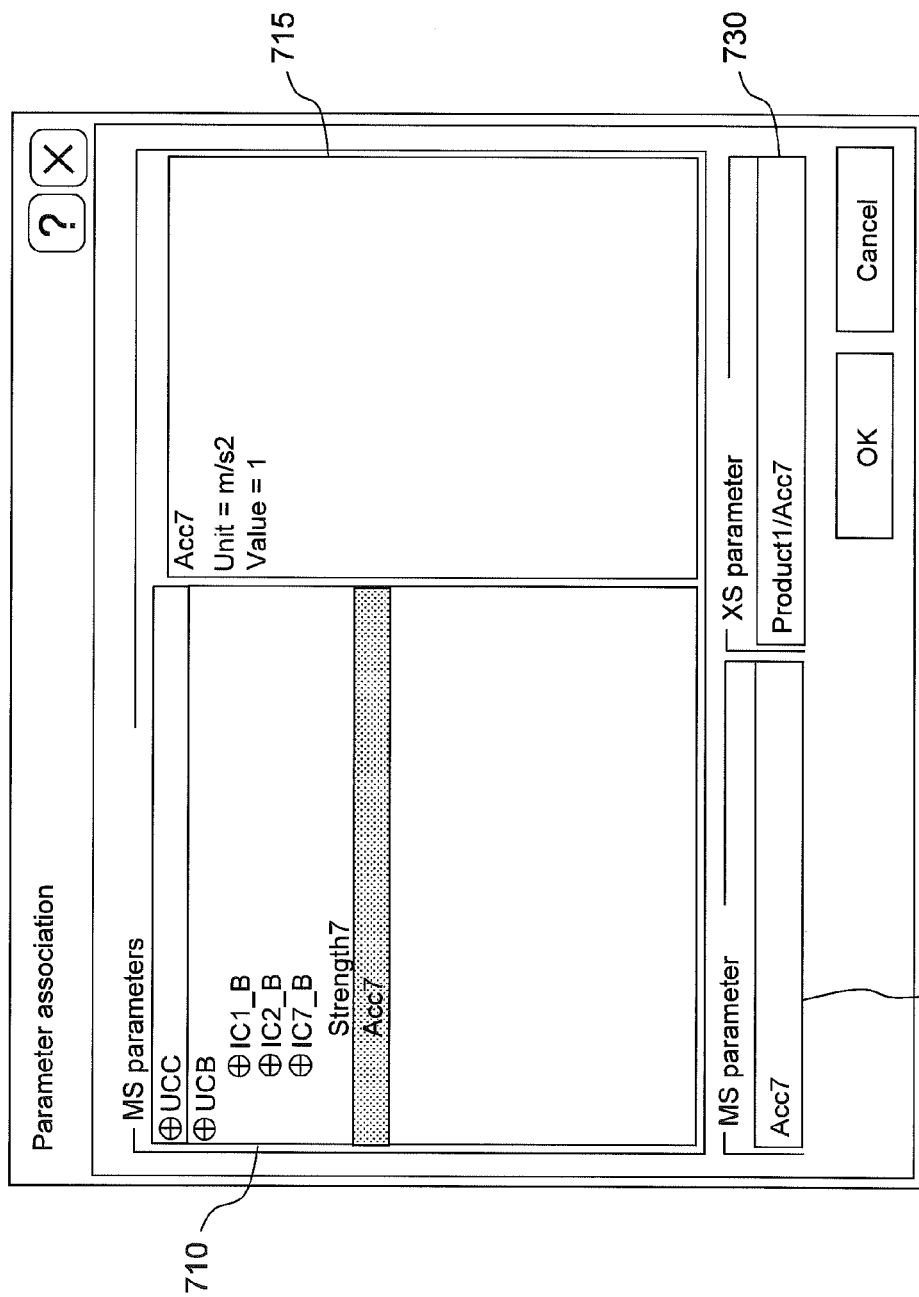

FIG. 7A illustrates one embodiment of a user interface of an auxiliary software XS application for defining the association between configuration parameters. A list 710 of configuration parameters is displayed. When a user selects one of the configuration parameter in the list, the attributes of the selected configuration parameter are displayed in a display zone 715 of the user interface. The name of the configuration parameter defined in the main software is displayed in a data entry field 720. A data entry field 730 is provided for entering the name of the associated configuration parameter instantiated within the auxiliary software XS.

In step 470, constraints can be imported from the main software to an auxiliary software XS. During step 470, user UB activates a function for importing constraints. However a constraint concerning one or more configuration parameters can only be imported when the configuration parameter(s) concerned by this constraint was (were) associated beforehand. The import of constraints is thus performed on the basis of associations defined between parameters.

A request is sent by the auxiliary software XS to the server software application 120 with an identification of the selected user configuration UCB. In response, a list of constraints of the selected user configuration UCB is sent to the auxiliary software XS. On receipt of the response, a user interface of the auxiliary software XS is displayed on the screen of the user terminal 104B with the list of constrains that enables user UB auxiliary software XS to import from the main software to the auxiliary software XS the constraints defined in a user data vector of the selected user configuration UCB.

The import of constraints may be performed either automatically or under control of the user UB.

When the import of constraints is performed automatically, user UB activates a function for requesting the automatic import of constraints. In response, a list of automatically constraint data defining the imported constraints is generated. In at least one embodiment, the generation of constraint data is performed by the software synchronization module 111 of the auxiliary software XS. Once the imports are performed, a user interface is displayed on the screen of the user terminal 104B with the list of imported constraints.

Correspondences rules between constraint types are defined for each auxiliary software XS that may be used in connection with the main software depending on the constraint types that may be defined within the auxiliary software XS. In at least one embodiment, the correspondences between constraint types is predefined within the software synchronization module 111 at software development stage. In at least one embodiment, the correspondence rules define one-to-one relationships between constraint types: a one-to-one relationship is defined between one constraint type that may be defined in the main software and one constraint type that may be defined in the auxiliary software XS. For example, the below list gives example of correspondences that may be defined for an auxiliary software XS.

- A mathematical relationship with equality may correspond to a calculation formula within the auxiliary software XS; for example if the constraint in the main software is "Y1=X1+50" where Y1 and X1 are two configuration parameters defined within the main software, then a calculation formula "Y2=X2+50" may be used in the auxiliary software XS for calculating the value assigned to the configuration parameter Y2, defined within the auxiliary software XS which is associated to Y1, from the value assigned to the configuration parameter X2, defined within the auxiliary software XS, which is associated to X1;
- A mathematical relationship with inequality may correspond to a verification within the auxiliary software XS; for example if the constraint in the main software is "Y1≤X1+50" where Y1 and X1 are two configuration parameters defined within the main software, then a verification may be performed in the auxiliary software XS for verifying that the value assigned to the configuration parameter Y2, defined within the auxiliary software XS which is associated to Y1 and the value assigned to the configuration parameter X2, defined within the auxiliary software XS, which is associated to X1, verify the following "Y2≤X2+50";
- A range of values may correspond to a couple of values within the auxiliary software XS whereby the couple of values correspond to the lower and upper values of the range of values; for example if the constraint in the main software is "47≤Y1≤50" where Y1 is a configuration parameter defined within the main software, then the values 47 and 50 may be stored in the auxiliary software XS as the minimum respectively maximum possible value for the configuration parameter Y2, defined within the auxiliary software XS which is associated to Y1.

In case the auxiliary software XS does not have a functionality for testing whether a constraint of a given constraint type is met, no association can be defined for the constraints of that constraint type: an indicator is used in the auxiliary software XS for representing within the auxiliary software XS the result (verified or not verified) of a compliance check performed within the main software on the concerned configuration parameter(s) relatively to a constraint of that constraint type. For example, for a logical constraint defined as "IF X<10, THEN Z=X+3 ELSE Z=X−3", an indicator FL is used in the auxiliary software XS for representing, within the auxiliary software XS, the result of a compliance check relatively to this logical constraint, performed within the main software, on the configuration parameters X and Z. The indicator may be in the form of a flag value, binary value, alphanumeric code, or any suitable form.

Constraint data defining a constraint C2 in the auxiliary software XS are generated when a constraint C1 defined in the main software has a corresponding type in the auxiliary software XS according to the defined correspondence rules. For a constraint C1 defined in the main software for which no corresponding constraint C2 can be defined, because the auxiliary software XS does not have a functionality for testing whether that constraint is met or when at least one configuration parameter was not associated within the auxiliary software XS, an indicator FL(C1) is defined in the auxiliary software XS for representing within the auxiliary software XS the result of a compliance check performed within the main software on the concerned configuration parameter(s) relatively to the constraint C1 defined in the main software. The name of this indicator may be representative of the constraint, for example may comprises a constraint name or related configuration parameter name.

The user UB may request to import only for some of the constraints or all of the constraints of the selected user configuration.

At the end of step 470, a user interface is displayed with a list of at least one constraint (if any) for which an import has been performed, a list of at least one constraint (if any) for which no import has been performed.

Constraint data defining imported constraints may be stored in a data file associated with the auxiliary software XS, for example the data file used for storing a model defined within the auxiliary software XS. The format used for storing this imported constraints may be any suitable format: text, XML or any proprietary coding format that would be specifically recognized/interpretable by the auxiliary software XS. Constraint data may comprise the identifiers and/or names of constraints, textual definition of a constraint (for example text coding an instruction or a function) in the main software MS and associated rules/values/parameters/formulas in the auxiliary software XS.

Step 470 may be repeated any number of times to import a constraint or update an existing imported constraints. After execution of step 470, user B may decide to perform step 460 or step 480.

FIG. 7B illustrates one embodiment of a user interface of an auxiliary software XS application for managing the import of constraints. A list 740 of constraints for which import may be performed is displayed before the imports are performed for those constraints. A list 741 of constraints for which no automatic generation can be defined (because the auxiliary software XS does not have a functionality for testing whether those constraints are met) may be displayed before the corresponding indicators are generated.

In step 480, values are generated and assigned to parameters defined within the auxiliary software XS. The values may result from design and/or simulation and/or computation step(s) performed by means of the auxiliary software XS (CAD/CAE software tool, . . . ) using configuration parameters defined within the auxiliary software XS, whether those configuration parameters are or not associated with configuration parameters defined within the main software.

At any time, user UB may decide, based on existing configuration parameter associations defined between main and auxiliary software XS during step 460, either to import within the main software one or several values assigned to one or several configuration parameters defined within the auxiliary software XS, or to import within the auxiliary software XS one or several values assigned to one or several configuration parameters defined within the main software. This value import process may be performed several times, depending on user needs.

For a value import to be performed, the auxiliary software XS sends to the server software application 120 a request. In case of a value import from the auxiliary software XS to the main software, the auxiliary software XS sends to the server software application 120 a request for assigning to one or several configuration parameters in the main software at least one value generated by the auxiliary software for a parameter associated to the concerned configuration parameter(s), the value(s) to be assigned being sent from the auxiliary software XS to the server software application 120. In case of a value import from the main software MS to the auxiliary software XS, the auxiliary software XS sends to the server software application 120 a request for assigning to one or several parameters in the auxiliary software XS at least one value generated by the main software MS for a configuration parameter associated to the concerned parameter(s), the value(s) to be assigned being sent from the server software application 120 to the auxiliary software XS.

For example, if a value V2 is assigned to a parameter Y2, defined within the auxiliary software XS which is associated to the configuration parameter Y1 defined within the main software, then the value V2 may be imported into the main software and assigned to the configuration parameter Y1. This value assignment may be executed during step 410 previously described. User UB may then request to perform the compliance check of step 420 within the main software.

For example, if a value V1 is assigned to a configuration parameter Y1, defined within the main software which is associated to the parameter Y2 defined within the auxiliary software XS, then the value V1 may be imported into the auxiliary software XS and assigned to the parameter Y2. User B may then request to perform one or several design and/or simulation step(s) by means of the auxiliary software XS in order to assign new values and/or to update values assigned to parameters defined within the auxiliary software XS, whether those parameters are or not associated with configuration parameters defined within the main software.

Figure 7C:
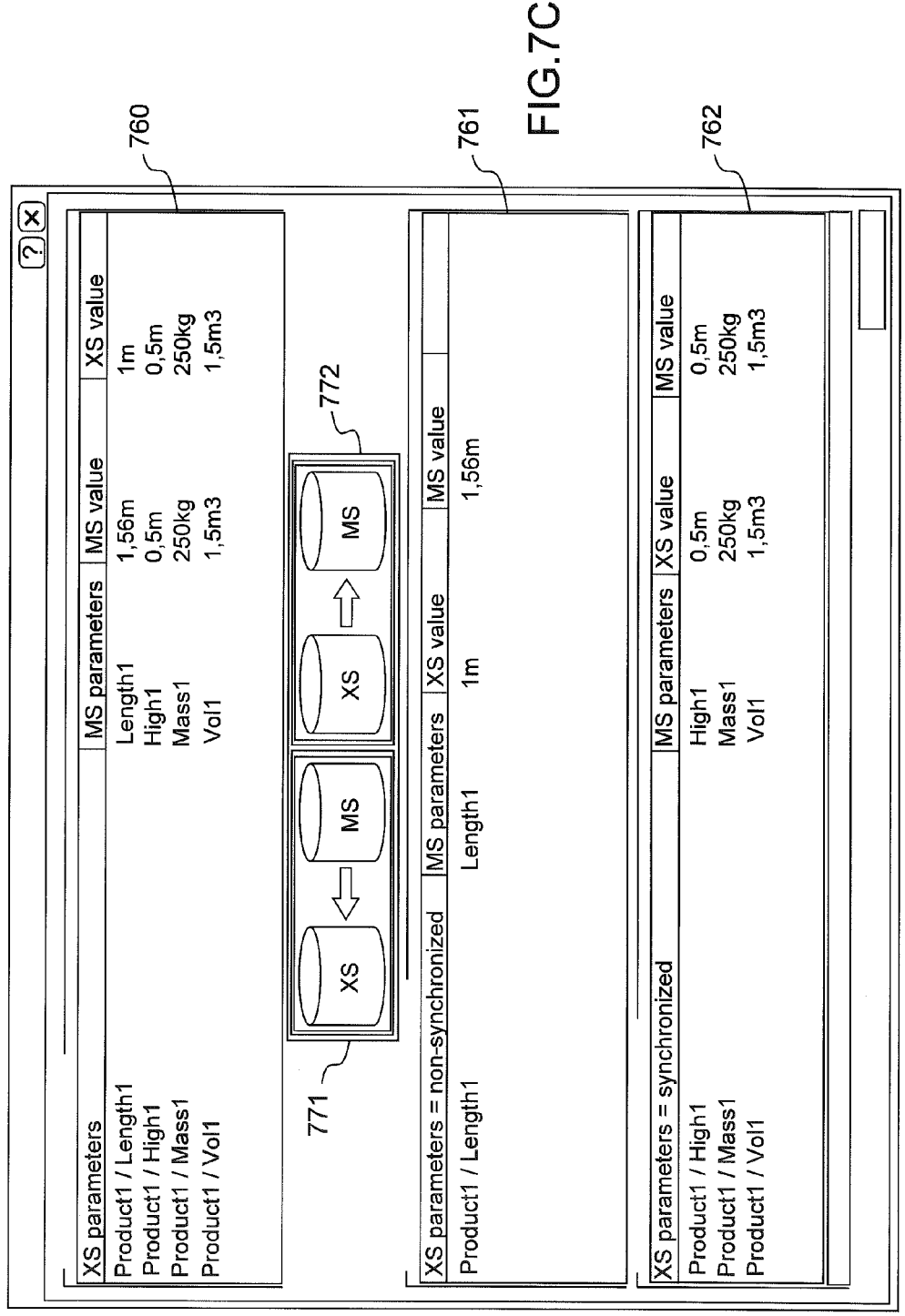

FIG. 7C illustrates one embodiment of a user interface of an auxiliary software XS for value assignment. Different lists may be displayed:

a list 760 of parameters defined within the auxiliary software XS;

a list 761 of unsynchronized associated parameters defined within the auxiliary software XS, for which an association has been defined with a configuration parameter defined within the main software and for which the set of value assigned in the auxiliary software XS is different than the set of value assigned in the main software;

a list 762 of synchronized associated parameters defined within the auxiliary software XS, for which an association has been defined with a configuration parameter defined within the main software and for which the set of value assigned in the auxiliary software XS is the same than the set of value assigned in the main software;

A user interface element 771 (button for example) may be provided for triggering the import of values assigned to a configuration parameter from the main software into the auxiliary software XS. A user interface element 772 (button for example) may be provided for triggering the import of values assigned to a parameter from the auxiliary software XS into the main software.

In step 490, a compliance check is performed on the values assigned to configuration parameters defined within the auxiliary software XS. This compliance check is performed in the auxiliary software XS using constraints defined within the auxiliary software XS.

In case an indicator FL is used in the auxiliary software XS for representing within the auxiliary software XS the result of a compliance check performed within the main software on one or several concerned configuration parameter(s) relatively to a constraint, a function of the software synchronization module 111 is activated to send a request to the server software application 120 with an identification of the concerned constraint(s). In such case, values assigned within the auxiliary software XS to configuration parameter(s) of the selected user configuration UCB which are concerned by the constraints to be verified, is sent to the server software application 120 and the compliance check is performed by the server software application 120 for that values. In response to the request, a result of the compliance check is sent by the server software application 120 to the software synchronization module 111. This result may be a binary value corresponding to the result of the compliance check and indicating whether the constraint is verified or not verified. A value representing this result is assigned to the indicator FL within the auxiliary software XS. A piece of information representative of that value is displayed in a user interface of the auxiliary software XS to indicate to the user UB whether the compliance check was successful or not.

After completion of step 490, any of steps 460, 470 or 480 may be executed again.

The invention claimed is:

1. A method for collaborative generation of technical configuration data of a product, said method being adapted to be implemented by a computing server configured to communicate with a plurality of user terminals and comprising:

storing in at least one database a set of at least one reference data vector defining a reference configuration, each reference data vector referring to a technical aspect of said product, at least one reference data vector comprising at least one configuration parameter and at least one constraint with which at least one value assigned to at least one configuration parameter of a user data vector instantiated from one said reference data vector has to comply, instantiating, in response to a first respectively second request received from a first respectively second client software application running on one of said user terminals in the context of a main software, a first respectively second set of at least one user data vector from a first respectively second subset of the reference configuration, the first respectively second set of user data vectors defining a first respectively second user configuration, receiving, from at least one software synchronization module running on one of said user terminals in the context of an auxiliary software, at least one value generated by the auxiliary software and assigned to a parameter created in the auxiliary software and associated to a first configuration parameter of a first user data vector of the first user configuration, performing a first compliance check on said at least one received value relatively to at least one constraint defined in the main software for said first configuration parameter and sending to the software synchronization module at least one indicator representative of a result of the first compliance check, assigning to said first configuration parameter at least one value generated by the auxiliary software for a parameter associated to said first configuration parameter, performing a consistency check by comparing values assigned to said first configuration parameter in a first modified user data vector of the first user configuration and in a second modified user data vector of the second user configuration and sending to the first or second client software application a first piece of information indicative of the result of the consistency check.

2. The method according to claim 1, further comprising:

receiving from the first respectively second client software application a validation request for a modified version of the first respectively second user configuration comprising at least one user data vector modified by an assignment of at least one value to a configuration parameter, performing a second compliance check of the first respectively second user configuration by checking for at least one modified user data vector whether at least one assigned value complies with at least one constraint defined for that value;

sending to said first respectively second client software application a second piece of information indicative of the result of the second compliance check.

3. The method according to claim 1, in which a plurality of values is assigned to the first configuration parameter in the first respectively second modified user data vector, the first respectively second modified user data vector comprising data defining a first respectively second weighting function for at least one value assigned to the first configuration parameter, a weight allocated to an assigned value according to said weighting function being representative of the technical relevance of said assigned value, the method comprising a determination of a set of at least one common value for said first configuration parameter on the basis of the first respectively second weighting function.

4. The method according to claim 2, in which at least one set of values assigned to a configuration parameter of a modified user data vector of the first respectively second user configuration is defined by at least one range of values, said second compliance check being performed for all values belonging to the range of values.

5. The method according to claim 2, in which at least one set of values assigned to a configuration parameter of a modified user data vector of the first respectively second user configuration is defined by a nominal value and by an acceptability range, said second compliance check being performed for the nominal value and all values belonging to the acceptability range.

6. The method according to claim 2, wherein a modified user data vector comprises a unit name representing a unit in which a value is assigned to a configuration parameter, the method further comprising:
storing a default unit for a configuration parameter representing a given physical quantity,
the second compliance check comprising converting automatically each assigned value of a configuration parameter which is not entered in the default unit to a value in the default unit, the second compliance check being performed on the basis of values converted in the default unit.

7. The method according to claim 1, further comprising:
recording of said first respectively second user configuration as being compliant when each value assigned to a configuration parameter complies with each constraint defined for a value assigned to the considered configuration parameter,
the consistency check being performed when said first respectively second user configurations are both recorded as being compliant.

8. The method according to claim 2, wherein the second piece of information is indicative of a detected non-compliant value in the first modified user data vector and comprises an identifier of a constraint for which a non-compliant value has been found, the method further comprising:
receiving a second validation request for a second version of the first user configuration,
performing a third compliance check for the second version of the first user configuration;
sending to said first user terminal a third piece of information indicative of the result of the third compliance check.

9. The method according to claim 8, further comprising: the generation of a validated reference configuration of said product comprising at least one reference data vector in which at least one common value found during the consistency check in said first modified user data vector of the first user configuration and in said second modified user data vector of the second user configuration is assigned to said first configuration parameter in the validated reference configuration.

10. The method according to claim 1, wherein the first piece of information is indicative of a detected conflict between the first and the second user configuration, the method further comprising:
receiving from at least one user terminal a request for ignoring a conflict detected for a configuration parameter,
generating the validated reference configuration by ignoring each configuration parameter for which a conflict is ignored.

11. The method according to claim 2, further comprising:
receiving a request for deactivating at least a first constraint of a user data vector,
registering said at least one constraint as being a deactivated constraint in response to said request,
the second compliance check being performed by ignoring a constraint registered as being deactivated.

12. A method for generating technical data defining a configuration of a product, said method being adapted to be implemented by a user terminal configured to communicate with a computing server and comprising:
sending, to a server software application running on said computing server by means of a client software application running on said user terminal in the context of a main software, at least one request identifying a subset of a set of at least one reference data vector stored in at least one database and defining a reference configuration, each reference data vector referring to a technical aspect of said product, at least one reference data vector comprising at least one configuration parameter and at least one constraint with which at least one value assigned to at least one configuration parameter of a user data vector instantiated from one said reference data vector has to comply,
receiving by the client software application in response to said request a set of at least one user data vector instantiated from said subset, the set of user data vectors defining a first user configuration,
sending to the server software application, by means of a software synchronization module running on said terminal in the context of an auxiliary software, at least one value generated by the auxiliary software and assigned to a parameter created in the auxiliary software and associated to a first configuration parameter of a first user data vector of the first user configuration,
receiving by the auxiliary software at least one indicator representative of a result of a first compliance check performed on said at least one value relatively to at least one constraint defined in the main software for said first configuration parameter,
sending to the server software application a request for assigning to said first configuration parameter in the main software at least one value generated by the auxiliary software for a parameter associated to said first configuration parameter,
receiving by the client software application a piece of information indicative of the result of a consistency check performed by comparing values assigned to said first configuration parameter in a first modified user data vector of the first user configuration and in a second modified user data vector of a second user configuration.

13. The method according to claim 12, further comprising:
sending to said processing unit a validation request for a modified version of said first user configuration comprising at least one instantiated user data vector modified by assignment of at least one value to a configuration parameter,
receiving from said processing unit a first piece of information indicative of the result of a second compliance check performed on said first user configuration to check for at least one modified user data vector whether at least one assigned value complies with at least one constraint defined for that value.

14. A non-transitory computer readable medium comprising instructions which when executed by a processor of a computing device causes said computing device to perform a method, the method comprising:
storing in at least one database a set of at least one reference data vector defining a reference configuration, each reference data vector referring to a technical aspect of said product, at least one reference data vector comprising at least one configuration parameter and at least one constraint with which at least one value assigned to at least one configuration parameter of a user data vector instantiated from one said reference data vector has to comply, instantiating, in response to a first respectively second request received from a first respectively second client software application running on one of said user terminals in the context of a main software, a first respectively second set of at least one user data vector from a first respectively second subset of the reference configuration, the first respectively second set of user data vectors defining a first respectively second user configuration, receiving, from at least one software synchronization module running on one of said user terminals in the context of an auxiliary software, at least one value generated by the auxiliary software and assigned to a parameter created in the auxiliary software and associated to a first configuration parameter of a first user data vector of the first user configuration, performing a first compliance check on said at least one received value relatively to at least one constraint defined in the main software for said first configuration parameter and sending to the software synchronization module at least one indicator representative of a result of the first compliance check, assigning to said first configuration parameter at least one value generated by the auxiliary software for a parameter associated to said first configuration parameter, performing a consistency check by comparing values assigned to said first configuration parameter in a first modified user data vector of the first user configuration and in a second modified user data vector of the second user configuration and sending to the first or second client software application a first piece of information indicative of the result of the consistency check.

15. A computing server configured to communicate with a plurality of user terminals and comprising:

a processor, a memory, operatively coupled to said processor, wherein the computing server is configured to perform a method for collaborative generation of technical data defining a configuration of a product, said method comprising:

storing in at least one database a set of at least one reference data vector defining a reference configuration, each reference data vector referring to a technical aspect of said product, at least one reference data vector comprising at least one configuration parameter and at least one constraint with which at least one value assigned to at least one configuration parameter of a user data vector instantiated from one said reference data vector has to comply, instantiating, in response to a first respectively second request received from a first respectively second client software application running on one of said user terminals in the context of a main software, a first respectively second set of at least one user data vector from a first respectively second subset of the reference configuration, the first respectively second set of user data vectors defining a first respectively second user configuration, receiving, from at least one software synchronization module running on one of said user terminals in the context of an auxiliary software, at least one value generated by the auxiliary software and assigned to a parameter created in the auxiliary software and associated to a first configuration parameter of a first user data vector of the first user configuration, performing a first compliance check on said at least one received value relatively to at least one constraint defined in the main software for said first configuration parameter and sending to the software synchronization module at least one indicator representative of a result of the first compliance check, assigning to said first configuration parameter at least one value generated by the auxiliary software for a parameter associated to said first configuration parameter, performing a consistency check by comparing values assigned to said first configuration parameter in a first modified user data vector of the first user configuration and in a second modified user data vector of the second user configuration and sending to the first or second client software application a first piece of information indicative of the result of the consistency check.

16. A user terminal configured to communicate with a computing server and comprising a processor, a memory, operatively coupled to said processor, wherein the user terminal is configured to perform a method for generation of technical data defining a configuration of a product, said method comprising:

sending, to a server software application running on said computing server by means of a client software application running on said user terminal in the context of a main software, at least one request identifying a subset of a set of at least one reference data vector stored in at least one database and defining a reference configuration, each reference data vector referring to a technical aspect of said product, at least one reference data vector comprising at least one configuration parameter and at least one constraint with which by at least one value assigned to at least one configuration parameter of a user data vector instantiated from one said reference data vector has to comply, receiving by the client software application in response to said request a set of at least one user data vector instantiated from said subset, the set of user data vectors defining a first user configuration, sending to the server software application, by means of a software synchronization module running on said terminal in the context of an auxiliary software, at least one value generated by the auxiliary software and assigned to a parameter created in the auxiliary software and associated to a first configuration parameter of a first user data vector of the first user configuration, receiving by the auxiliary software at least one indicator representative of a result of a first compliance check performed on said at least one value relatively to at least one constraint defined in the main software for said first configuration parameter, sending to the server software application a request for assigning to said first configuration parameter in the main software at least one value generated by the auxiliary software for a parameter associated to said first configuration parameter, receiving by the client software application a piece of information indicative of the result of a consistency check performed by comparing values assigned to said first configuration parameter in a first modified user data vector of the first user configuration and in a second modified user data vector of a second user configuration.

* * * * *